US008649297B2

(12) United States Patent
Ahlers et al.

(10) Patent No.: US 8,649,297 B2
(45) Date of Patent: Feb. 11, 2014

(54) SYSTEM AND METHOD FOR SIMPLIFYING SECURE NETWORK SETUP

(75) Inventors: Timothy F. Ahlers, Seattle, WA (US); Aaron H. Averbuch, Seattle, WA (US); Coyle B. Marl, Seattle, WA (US); John-Anthony Owens, Seattle, WA (US); John L. W. Furlan, Blemont, CA (US); Jonathan Kaplan, San Francisco, CA (US); Ariel Braunstein, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 414 days.

(21) Appl. No.: 12/732,446

(22) Filed: Mar. 26, 2010

(65) Prior Publication Data

US 2011/0235549 A1 Sep. 29, 2011

(51) Int. Cl.
*H04L 1/00* (2006.01)
*H04L 12/26* (2006.01)

(52) U.S. Cl.
USPC .......................................... 370/255; 370/252

(58) Field of Classification Search
USPC .......................................... 370/252, 254, 255
See application file for complete search history.

(56) References Cited

U.S. PATENT DOCUMENTS

| | | | |
|---|---|---|---|
| 5,383,178 A | | 1/1995 | Unverrich |
| 5,396,485 A | | 3/1995 | Ohno et al. |
| 5,420,572 A | * | 5/1995 | Dolin et al. .................. 340/9.16 |
| 5,712,914 A | | 1/1998 | Aucsmith et al. |
| 5,758,083 A | | 5/1998 | Singh et al. |
| 5,768,483 A | | 6/1998 | Maniwa et al. |
| 5,774,667 A | | 6/1998 | Garvey et al. |
| 5,838,907 A | | 11/1998 | Hansen |
| 5,974,237 A | | 10/1999 | Shurmer et al. |
| 5,978,568 A | | 11/1999 | Abraham et al. |
| 6,006,272 A | | 12/1999 | Aravamudan et al. |
| 6,023,723 A | | 2/2000 | McCormick et al. |
| 6,157,950 A | | 12/2000 | Krishnan |
| 6,456,306 B1 | | 9/2002 | Chin et al. |

(Continued)

FOREIGN PATENT DOCUMENTS

| | | |
|---|---|---|
| EP | 1315334 | 5/2003 |
| EP | 1370025 | 12/2003 |

(Continued)

OTHER PUBLICATIONS

"Wi-Fi Alliance™ for Wi-Fi Protected Setup Specification," Version 1.0h, Dec. 2006, 110 pages.

(Continued)

*Primary Examiner* — Ronald Abelson
(74) *Attorney, Agent, or Firm* — Patent Capital Group

(57) ABSTRACT

A method in one example implementation includes discovering a networking device within a wireless connectivity range from a first computing device. The networking device may be configured for wireless connectivity by sending new network configuration settings to the networking device to be stored in a memory element. The method also includes configuring the first computing device to initiate a wireless connection to the networking device, such that the wireless connection is created without requiring the user to provide any configuration settings associated with the wireless connection. In more specific embodiments, if it is determined that the networking device is unconfigured, then the new network configuration settings are automatically generated. In other more specific embodiments, the new network configuration settings include a new network identifier and a new network password.

48 Claims, 27 Drawing Sheets

(56) References Cited

U.S. PATENT DOCUMENTS

| | | |
|---|---|---|
| 6,530,018 B2 | 3/2003 | Fleming |
| 6,584,074 B1 | 6/2003 | Vasamsetti et al. |
| 6,631,118 B1 | 10/2003 | Jones |
| 6,678,250 B1 | 1/2004 | Grabelsky et al. |
| 6,728,262 B1 | 4/2004 | Woram |
| 6,778,505 B1 | 8/2004 | Bullman et al. |
| 6,801,941 B1 | 10/2004 | Stephens et al. |
| 6,892,245 B1 | 5/2005 | Crump et al. |
| 6,925,085 B1 | 8/2005 | Krishna et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,027,808 B2 | 4/2006 | Wesby |
| 7,039,688 B2 | 5/2006 | Matsuda et al. |
| 7,042,988 B2 | 5/2006 | Juitt et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,187,461 B2 | 3/2007 | Schlonski et al. |
| 7,200,551 B1 | 4/2007 | Senez |
| 7,240,106 B2 | 7/2007 | Cochran et al. |
| 7,249,171 B2 | 7/2007 | Goto |
| 7,269,653 B2 | 9/2007 | Mentze et al. |
| 7,283,517 B2 | 10/2007 | Yan et al. |
| 7,310,664 B1 | 12/2007 | Merchant et al. |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2 | 6/2008 | Motoyama et al. |
| 7,418,702 B2 | 8/2008 | Tsao |
| 7,421,466 B2 | 9/2008 | Haines |
| 7,457,737 B2 | 11/2008 | Patiejunas |
| 7,460,546 B2 | 12/2008 | Anderson, IV |
| 7,475,133 B2 | 1/2009 | Nuggehalli |
| 7,496,660 B2 | 2/2009 | Blaisdell et al. |
| 7,499,999 B2 | 3/2009 | Ocepek et al. |
| 7,506,048 B1 | 3/2009 | Motoyama et al. |
| 7,509,415 B2 | 3/2009 | Baekelmans et al. |
| 7,545,762 B1 | 6/2009 | McConnell et al. |
| 7,565,418 B2 | 7/2009 | Ferrari et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 7,769,409 B2 | 8/2010 | Harris et al. |
| 7,783,777 B1 | 8/2010 | Pabla et al. |
| 7,787,416 B2 | 8/2010 | Gidwani |
| 7,823,199 B1 | 10/2010 | Rathi et al. |
| 7,853,880 B2 | 12/2010 | Porter |
| 8,159,949 B2 | 4/2012 | Pham |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0191556 A1* | 12/2002 | Krishnarajah et al. ......... 370/329 |
| 2002/0196463 A1 | 12/2002 | Schlonski et al. |
| 2003/0005112 A1 | 1/2003 | Krautkremer |
| 2003/0018889 A1 | 1/2003 | Burnett et al. |
| 2003/0033402 A1 | 2/2003 | Battat et al. |
| 2003/0040813 A1* | 2/2003 | Gonzales et al. ............... 700/19 |
| 2003/0041238 A1 | 2/2003 | French et al. |
| 2003/0061336 A1 | 3/2003 | Van Den Bosch et al. |
| 2003/0069947 A1 | 4/2003 | Lipinski |
| 2003/0078965 A1 | 4/2003 | Cocotis et al. |
| 2003/0078999 A1 | 4/2003 | Lund et al. |
| 2003/0086425 A1 | 5/2003 | Bearden et al. |
| 2003/0097439 A1 | 5/2003 | Strayer et al. |
| 2003/0115298 A1 | 6/2003 | Baker |
| 2003/0115314 A1 | 6/2003 | Kawashima |
| 2003/0187985 A1 | 10/2003 | Rohling et al. |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0221122 A1 | 11/2003 | Hatori |
| 2003/0229688 A1 | 12/2003 | Liang |
| 2004/0003292 A1 | 1/2004 | Kato |
| 2004/0005873 A1 | 1/2004 | Groenendaal et al. |
| 2004/0015575 A1 | 1/2004 | Motoyama |
| 2004/0030620 A1 | 2/2004 | Benjamin et al. |
| 2004/0039704 A1 | 2/2004 | Gilliam et al. |
| 2004/0040023 A1 | 2/2004 | Ellis et al. |
| 2004/0049714 A1 | 3/2004 | Marples et al. |
| 2004/0064558 A1 | 4/2004 | Miyake |
| 2004/0083299 A1 | 4/2004 | Dietz et al. |
| 2004/0093383 A1 | 5/2004 | Huang et al. |
| 2004/0111505 A1 | 6/2004 | Callahan et al. |
| 2004/0146006 A1 | 7/2004 | Jackson |
| 2004/0155899 A1 | 8/2004 | Conrad |
| 2004/0156346 A1 | 8/2004 | O'Neill |
| 2004/0162986 A1 | 8/2004 | Metzger |
| 2004/0172469 A1 | 9/2004 | Takahashi et al. |
| 2004/0193709 A1 | 9/2004 | Selvaggi et al. |
| 2004/0199630 A1 | 10/2004 | Sarkissian et al. |
| 2004/0199647 A1 | 10/2004 | Ramarao et al. |
| 2004/0203592 A1* | 10/2004 | Kermode et al. ............ 455/411 |
| 2004/0204051 A1 | 10/2004 | Scott et al. |
| 2004/0236759 A1 | 11/2004 | Young |
| 2004/0255023 A1 | 12/2004 | Motoyama et al. |
| 2005/0004866 A1 | 1/2005 | Bonalle et al. |
| 2005/0005013 A1 | 1/2005 | Saint-Hailaire et al. |
| 2005/0018241 A1 | 1/2005 | Azami |
| 2005/0050189 A1 | 3/2005 | Yang |
| 2005/0050190 A1 | 3/2005 | Dube |
| 2005/0054326 A1 | 3/2005 | Rogers |
| 2005/0060535 A1 | 3/2005 | Bartas |
| 2005/0063350 A1 | 3/2005 | Choudhury et al. |
| 2005/0078681 A1 | 4/2005 | Sanuki et al. |
| 2005/0085244 A1 | 4/2005 | Choi et al. |
| 2005/0086197 A1 | 4/2005 | Boubez et al. |
| 2005/0086282 A1 | 4/2005 | Anderson et al. |
| 2005/0091504 A1 | 4/2005 | Shirogane |
| 2005/0111420 A1 | 5/2005 | Fujii |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0160138 A1 | 7/2005 | Ishidoshiro |
| 2005/0165828 A1 | 7/2005 | Lango et al. |
| 2005/0165919 A1 | 7/2005 | Qian et al. |
| 2005/0184852 A1 | 8/2005 | Lee et al. |
| 2005/0198221 A1 | 9/2005 | Manchester et al. |
| 2005/0198274 A1 | 9/2005 | Day |
| 2005/0216602 A1 | 9/2005 | Armstrong et al. |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240665 A1 | 10/2005 | Gu et al. |
| 2005/0240758 A1 | 10/2005 | Lord et al. |
| 2005/0243777 A1 | 11/2005 | Fong |
| 2006/0015939 A1 | 1/2006 | Aston et al. |
| 2006/0031457 A1 | 2/2006 | Motoyama |
| 2006/0036847 A1 | 2/2006 | Bush et al. |
| 2006/0037036 A1 | 2/2006 | Min et al. |
| 2006/0037075 A1 | 2/2006 | Frattura et al. |
| 2006/0041891 A1 | 2/2006 | Aaron |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168167 A1* | 7/2006 | Kushalnagar et al. ........ 709/222 |
| 2006/0168195 A1 | 7/2006 | Maturana et al. |
| 2006/0168263 A1 | 7/2006 | Blackmore |
| 2006/0172734 A1 | 8/2006 | Tak et al. |

(56) References Cited

U.S. PATENT DOCUMENTS

| | | | |
|---|---|---|---|
| 2006/0258341 A1 | 11/2006 | Miller | |
| 2006/0272014 A1 | 11/2006 | McRae et al. | |
| 2006/0280189 A1 | 12/2006 | McRae et al. | |
| 2006/0291443 A1 | 12/2006 | Harrington et al. | |
| 2007/0015463 A1* | 1/2007 | Abel et al. | 455/41.1 |
| 2007/0022185 A1 | 1/2007 | Hamilton et al. | |
| 2007/0058567 A1 | 3/2007 | Harrington et al. | |
| 2007/0076621 A1 | 4/2007 | Malhotra et al. | |
| 2007/0106768 A1 | 5/2007 | Frietsch et al. | |
| 2007/0111568 A1 | 5/2007 | Ferrari et al. | |
| 2007/0115950 A1 | 5/2007 | Karaguz et al. | |
| 2007/0130286 A1 | 6/2007 | Hopmann et al. | |
| 2007/0133569 A1 | 6/2007 | Lee et al. | |
| 2007/0143749 A1 | 6/2007 | Date et al. | |
| 2007/0204150 A1 | 8/2007 | Jokela et al. | |
| 2007/0268506 A1 | 11/2007 | Zeldin | |
| 2007/0268515 A1 | 11/2007 | Freund et al. | |
| 2007/0268516 A1 | 11/2007 | Bugwadia et al. | |
| 2007/0276931 A1 | 11/2007 | Mahdavi et al. | |
| 2007/0291945 A1* | 12/2007 | Chuang et al. | 380/270 |
| 2008/0008125 A1 | 1/2008 | Pham et al. | |
| 2008/0037552 A1 | 2/2008 | Dos Remedios et al. | |
| 2008/0043989 A1 | 2/2008 | Furutono et al. | |
| 2008/0049779 A1 | 2/2008 | Hopmann et al. | |
| 2008/0052384 A1 | 2/2008 | Marl et al. | |
| 2008/0065760 A1 | 3/2008 | Damm et al. | |
| 2008/0070603 A1 | 3/2008 | Mao | |
| 2008/0134164 A1 | 6/2008 | Stich et al. | |
| 2008/0175187 A1 | 7/2008 | Lowry et al. | |
| 2008/0216154 A1 | 9/2008 | Fontaine | |
| 2008/0243699 A1 | 10/2008 | Hilerio et al. | |
| 2009/0017832 A1 | 1/2009 | Tebbs et al. | |
| 2009/0019141 A1 | 1/2009 | Bush et al. | |
| 2009/0019147 A1 | 1/2009 | Ahlers et al. | |
| 2009/0019314 A1 | 1/2009 | Younger et al. | |
| 2009/0037606 A1 | 2/2009 | Diab | |
| 2009/0046656 A1* | 2/2009 | Kitazoe et al. | 370/331 |
| 2009/0052338 A1 | 2/2009 | Kelley et al. | |
| 2009/0055514 A1 | 2/2009 | Tebbs et al. | |
| 2009/0109897 A1* | 4/2009 | Woo | 370/328 |
| 2010/0020694 A1 | 1/2010 | Jones | |
| 2010/0035595 A1 | 2/2010 | Duggal et al. | |
| 2010/0093278 A1 | 4/2010 | Abel | |
| 2010/0250725 A1 | 9/2010 | Meenan et al. | |
| 2011/0047254 A1 | 2/2011 | Vainionpaa et al. | |
| 2012/0008529 A1 | 1/2012 | Averbuch et al. | |

FOREIGN PATENT DOCUMENTS

| | | |
|---|---|---|
| EP | 1538792 | 6/2005 |
| EP | 1553729 | 7/2005 |
| EP | 1638258 | 3/2006 |
| EP | 1639751 A1 | 3/2006 |
| EP | 1701478 A1 | 9/2006 |
| EP | 1894314 A2 | 3/2008 |
| EP | 1965541 A1 | 9/2008 |
| EP | 2324652 A1 | 5/2011 |
| GB | 2411801 | 9/2005 |
| JP | 2001-222497 A | 8/2001 |
| JP | 2001-352328 A | 12/2001 |
| KR | 2004-0047209 A1 | 7/2004 |
| KR | 10-2005-0031175 A | 4/2005 |
| KR | 2005-0078541 A | 8/2005 |
| KR | 2005-0094247 A | 9/2005 |
| WO | WO2005/004401 | 1/2005 |
| WO | WO2007/001629 | 1/2007 |
| WO | WO2007/136804 | 11/2007 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |
| WO | WO2010/016855 | 2/2010 |
| WO | WO2011/119264 | 9/2011 |

OTHER PUBLICATIONS

PCT Notification of the International Search Report and the Written Opinion of the International Searching Authority, or the Declaration, International Application No. PCT/US2008/063318, mailed Sep. 25, 2008, 6 pages.

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," © 2004 IEEE, 11 pages.

Kazuya Kubo, et al., "Hybrid Peer-to-Peer System for Network Monitoring of Field Devices," Downloaded May 14, 2009 from IEEE Xplore, © 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Sep. 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

Microsoft Corporation, "Windows Connect Now-UFD for Windows XP Specification," © 2010, Updated Sep. 15, 2006, 1 page; http://www.microsoft.com/whdc/connect/Rally/WCN-UFD_XPspec.mspx.

Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.

Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.

Microsoft Corporation, "Windows Connect Now-UFD Windows Vista" Version 1.0 © 2010—Sep. 15, 2006, 28 pp.; http://www.microsoft.com/whdc/connect/Rally/WCN-UFD_Vistaspec.doc.

Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.net-

(56) References Cited

OTHER PUBLICATIONS working.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.

Flip Video, "Quick Start Guide: FlipshareTV," © 2009 Cisco Systems, Inc., 19 pages; http://www.theflip.com/pdf/en-US/FlipShareTVQuickStartGuide.pdf.

"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.

"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.

Byoung-Koo Kim/Jong-Su Jang/Tai M. Chung, Design of Network Security Control System for Cooperative Intrusion Detection, 2002, pp. 389-398.

U.S. Appl. No. 13/029,335, filed Feb. 17, 2011, entitled "Network Management," Inventor(s) Steven M. Bush, et al.

U.S. Appl. No. 13/030,982, filed Feb. 18, 2011, entitled "Network Management," inventor(s) Steven M. Bush, et al.

U.S. Appl. No. 13/031,121, filed Feb. 18, 2011, entitled "Network Management," Inventor(s) Steven M. Bush, et al.

"Near Field Communication White Paper," Ecma International, 2005; 12 pages. http://www.ecma-international.org/activities/Communications/tc32-tg19-2005-012.pdf.

"Universal Plug and Play Device Architecture, UPnP, Version 1.0," Microsoft Corporation, Protocols, Jun. 8, 2000; 54 pages; http://upnp.org/specs/arch/UPnPDA10_20000613.pdf.

EPO Nov. 15, 2007 European Search Report and Opinion from European Application No. EP07017509; 8 pages.

Khedr, Mohamed, et al., "Acan-Ad Hoc Context Aware Networks," Online! 2002, XP002300569; 5 pages;http://citeseerx.ist.psu.edu/viewdoc/summary?doi=10.1.1.20.1469.

Krishnamurthy, Lakshman, et al., "Meeting the Demands of the Digital Home with high-Speed Multi-Hop Wireless Networks," Intel Technology Journal, vol. 6, Nov. 15, 2002, pp. 57-68; http://download.intel.com/technology/itj/2002/volume06issue04/vol6iss4_interoperable_home_infrastructure.pdf.

PCT Oct. 27, 2004 International Search Report from International Application PCT/US2004/021429; 3 pages.

PCT Jan. 3, 2006 International Preliminary Report on Patentability and Written Opinion of the International Search Authority from International Application PCT/US2004/021429; 7 pages.

PCT Dec. 24, 2007 International Preliminary Report on Patentability and Written Opinion of the International Search Authority from International Application PCT/US2006/17500; 6 pages.

PCT Aug. 7, 2007 International Search Report from International Application PCT/US06/17500; 1 page.

PCT Nov. 21, 2008 International Preliminary Report on Patentability and Written Opinion of the International Search Authority from International Application PCT/US2007/012016; 5 pages.

PCT Jan. 4, 2008 International Search Report from International Application PCT/US07/12016; 1 page.

PCT Apr. 24, 2009 International Search Report from International Application PCT/US2008/08544; 2 pages.

PCT Aug. 2, 2011 International Preliminary Report on Patentability and Written Opinion of the International Search Authority from International Application PCT/US2008/08544; 7 pages.

PCT Aug. 25, 2011 International Search Report and Written Opinion of the International Searching Authority from International Application PCT/US2011/024462.

Rasheed, Yasser, et al, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.

Walker, Mark, et al., "Remote I/O: Freeing the Experience from the Platform with UPnP Architecture," Intel Technology Journal, vol. 6, Nov. 15, 2002, pp. 30-36; http://download.intel.com/technology/itj/2002/volume06issue04/vol6iss4_interoperable_home_infrastructure.pdf.

U.S. Appl. No. 13/235,007, filed Sep. 16, 2011, entitled "Configuring a Secure Network," Inventor(s) Aaron H. Averbuch, et al.

Karygiannos, Tom, et al., "Wireless Network Security 802.11 Bluetooth and Handheld Devices," NIST Special Publication 800-48, Technology Administration, Dept. of Commerce, 2002, 119 pages.

EPO Apr. 5, 2012 Search Report and Written Opinion from European Application 08769420.4; 8 pages.

PCT Oct. 11, 2012 Notification Concerning Transmittal of International Preliminary Report on Patentability and the International Preliminary Report on Patentability and Written Opinion of the International Searching Authority from Application No. PCT/US2011/024462; 9 pages.

EPO Oct. 24, 2012 Response to Written Opinion from European Application 0876920.4; 21 pages.

\* cited by examiner

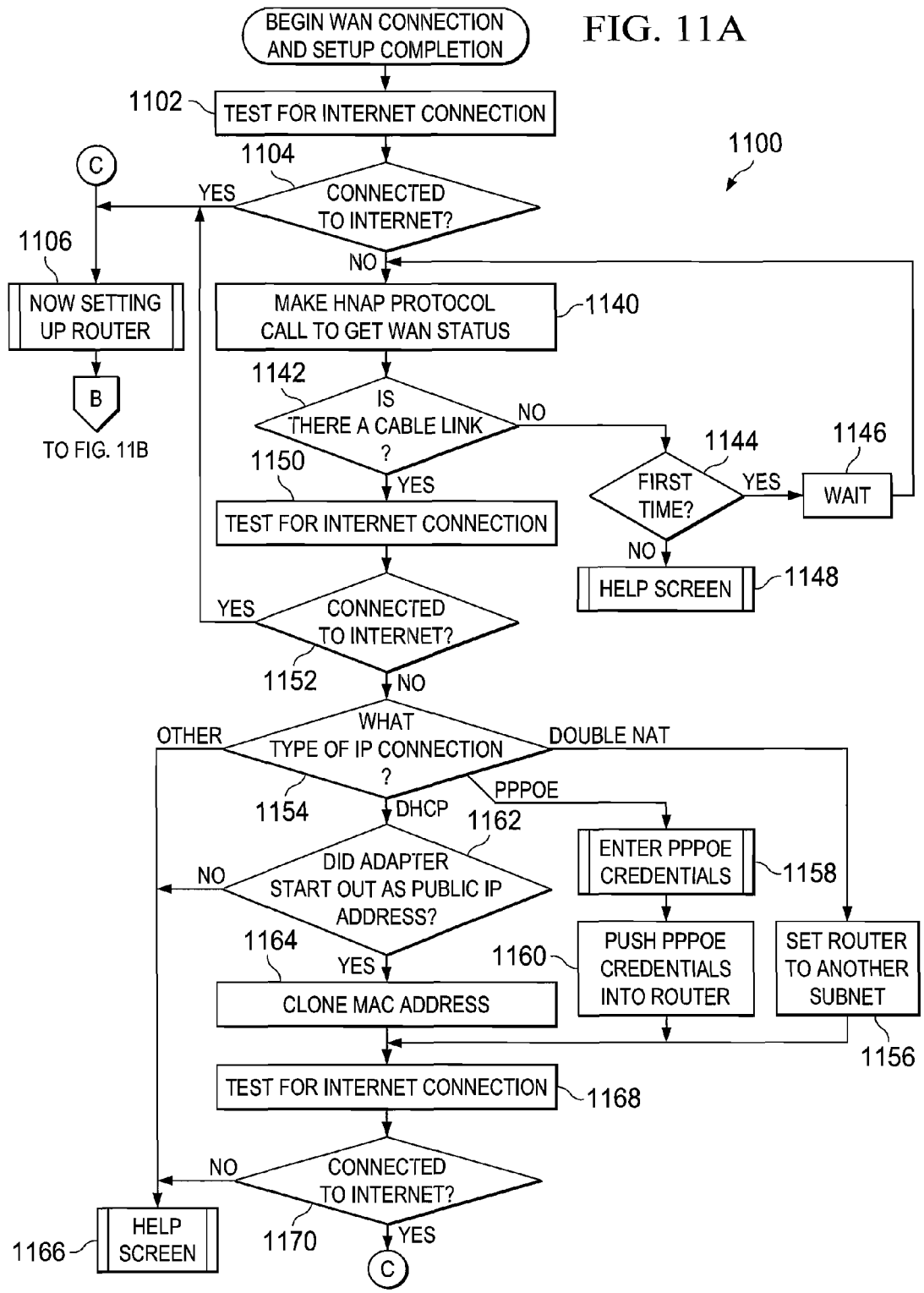

FACTORY SETTINGS: 1410

```
<?xml version="1.0" encoding="utf-8" ?>
<Settings
    ModelName='E3000'
    DefaultMode='Connect'
/>
```

AFTER ROUTER CONFIGURATION: 1420

```
<?xml version="1.0" encoding="utf-8" ?>
<!-- Last modified by Setup.exe (1.1.10025.0) on 1/25/2010 at 2:52:33 PM -->
    <Settings
    ModelName="E2000"
    DefaultMode="Connect"
    WirelessSSID="ShortWillow"
    WirelessPassword="PhJc9WMGUz"
    AdminPassword="PhJc9WMGUz"
    SerialNumber="XXXXXXXXXXX"
    IsAlreadySetUp="true" />
```

FIG. 14

AFTER SETUP IS COMPLETE AND
ADMINISTRATIVE TOOL COMPONENT IS INSTALLED:

```
<?xml version="1.0" encoding="utf-8" ?>
<!-- Last modified by Setup.exe (1.1.10025.0) on 1/25/2010 at 2:52:33 PM -->
<Settings
    ModelName="E2000"
    DefaultMode="Tool"
    WirelessSSID="ShortWillow"
    WirelessPassword="PhJc9WMGUz"
    AdminPassword="PhJc9WMGUz"
    SerialNumber="XXXXXXXXXXX"
    IsAlreadySetUp="true" />
```

1430

SYSTEM AND METHOD FOR SIMPLIFYING SECURE NETWORK SETUP

TECHNICAL FIELD

This disclosure relates in general to the field of computer networks and, more particularly, to simplifying the setup and configuration of a secure network.

BACKGROUND

Computing devices and computer networking have become an integral part of daily life in today's society. Personal and business usage of computing devices, such as laptops, personal computers, smartphones (i.e., cell phones offering advanced computing capabilities), personal digital assistants (PDAs), and the like, have exploded in recent years. In addition, other electronic devices such as printers, gaming devices, smart appliances, etc. have also surged in popularity. For example, a home may include one or more personal computers, a printing device, a gaming device shared by family members, and one or more smartphones owned by individual family members. Small businesses may provide personal computers and smartphones or PDAs for employees, in addition to one or more printers shared by the employees.

Private local area networks (LANs) may be used to enhance the usefulness and potential of computing devices and other electronic devices in homes and small businesses. In a LAN, devices may be linked together through a networking device, such as a router. The router may be connected to other private and public networks, such as the Internet. In such a configuration, the router facilitates communication by routing packets of data between the devices within the LAN and also to and from other devices in private and public networks outside the LAN. Thus, home users and small businesses may use LANs to enable their computing devices and other electronic devices to communicate both within the private network and outside the private network. To setup and secure a LAN with a networking device such as a router, knowledge of router configuration is typically required. This can be daunting for most individuals who have little or no understanding of the technical aspects of computers or computer networks. Thus, a simplified approach for configuring secure networks would be useful.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 11A and 11B show a flowchart illustrating more detailed steps of the configure wide area network connection step of FIG. 5 in accordance with embodiments of the disclosure;

FIG. 14 shows sample file contents of an exemplary configuration settings file during various stages of the secure network setup flow in accordance with embodiments of the disclosure;

DETAILED DESCRIPTION OF EXAMPLE EMBODIMENTS

Overview

A method in one example implementation includes discovering a networking device within a wireless connectivity range from a first computing device. The networking device may be configured for wireless connectivity by sending new network configuration settings to the networking device to be stored in a memory element. The method also includes configuring the first computing device to initiate a wireless connection to the networking device, such that the wireless connection is created without requiring the user to provide any configuration settings associated with the wireless connection. In more specific embodiments, the method includes determining whether the networking device is unconfigured and if so, then generating the new network configuration settings. In other more specific embodiments, the new network configuration settings include a new network identifier and a new network password. In further specific embodiments, the method includes determining whether the networking device has made an operative connection to a wide area network, so that packets of data can be exchanged between the networking device and the wide area network.

Example Embodiments

Figure 1:
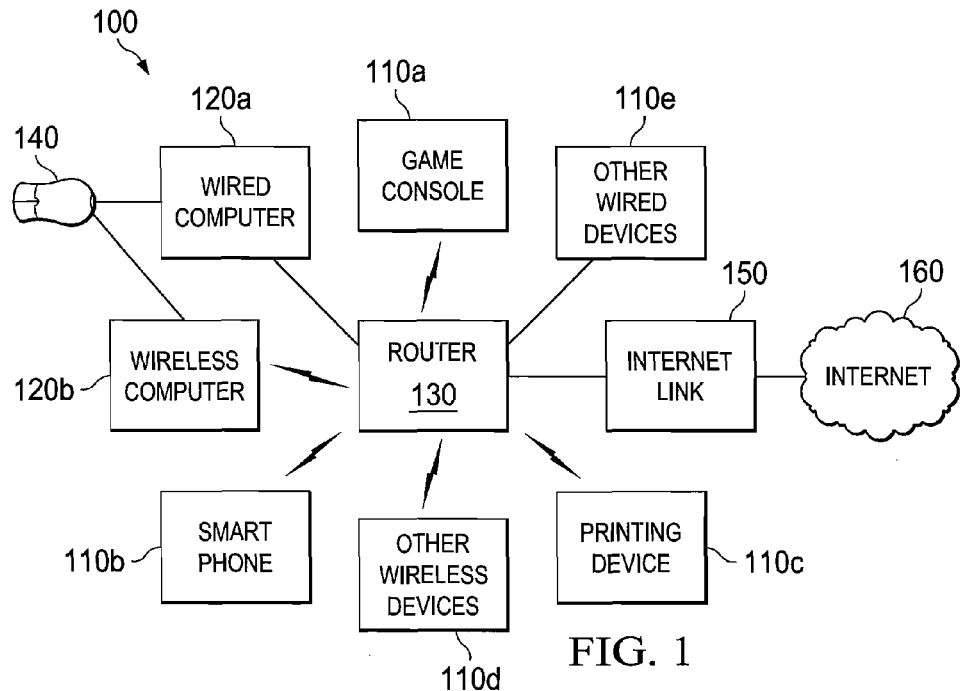
FIG. 1 illustrates an exemplary network environment in which embodiments of a system and method for simplifying secure network setup may be implemented.

FIG. 1 illustrates an example of a network 100 in which a system and method according to the present disclosure may be implemented. Network 100 may include a variety of different networked devices such as computers and other electronic devices. For example, network 100 may include computers such as a hardwired computer 120a and a wireless computer 120b. Network 100 may also include other electronic devices such as a game console 110a, a smartphone 110b, a printing device 110c, other wireless devices 110d, and other wired devices 110e. Each of these computers and other devices may be hardwired or wirelessly connected to a common networking device, such as a router 130, which facilitates communication between the networked devices. Router 130 may also facilitate communication with other private or public networks outside network 100, such as Internet 160. In one embodiment, an Internet link 150 (e.g., a telephone modem, a DSL modem, a cable modem, an optical modem, etc.) may be suitably configured to connect router 130 to Internet 160. Also, a setup key 140 may be provided with suitable configuration settings and/or executable instructions to accomplish the secure setup of router 130 to computers 120 and other electronic devices 110.

In example embodiments, a system and method for simplifying secure network setup may be implemented in network 100 by providing setup key 140 and router 130 to simplify interconnecting wireless and/or hardwired computers and other electronic devices through router 130 such that packets of data can be securely exchanged by the networked devices. During the initial setup and configuration of network 100, setup key 140 may provide executable instructions to a computer, such as wireless computer 120b, for automatically configuring router 130 to securely communicate wirelessly with computer 120b, without the need for configuration settings or other substantive information from a user. During the initial setup, communication between router 130 and another network, such as Internet 160, may also be established. Once the initial setup and configuration of router 130 and wireless computer 120b has been completed, setup key 140 may be used to store configuration settings of router 130 to enable the secure connection of additional computers to router 130 by providing setup key 140 to the additional computers. In addition, an administrative tool application may be installed on computer 120b to provide a user with the ability to configure additional devices to be added to network 100 and to configure administrative settings for network 100, such as parental controls, guest access, and/or router settings.

For purposes of illustrating the techniques of such a system, it is important to understand the activities occurring within a network environment having a variety of networked devices such as computers and other electronic devices interconnected to each other and to other networks by a common networking device such as a router. The following foundational information may be viewed as a basis from which the present disclosure may be properly explained. Such information is offered earnestly for purposes of explanation only and, accordingly, should not be construed in any way to limit the broad scope of the present disclosure and its potential applications.

Although private networks utilizing wireless connections are highly desirable, the setup and configuration of such networks can be a difficult and cumbersome task for most users. Wireless networks are desirable because computers and other electronic devices can be easily moved and positioned throughout a home or small business. Incorporating wireless communication also helps minimize aesthetically unpleasant cable clutter. Wireless communication, however, can be more susceptible to security breaches. Therefore, such networks should be carefully configured with appropriate security settings.

Most users have limited knowledge of the technical aspects of computer networking, and consequently, have difficulty configuring secure wireless networks. A typical private network may include one or more computing devices, a common networking device such as a router, and an Internet connection. Depending upon the particular devices and existing network configuration, configuring a wireless router may require the user to input one or more of the following identifiers and passwords: web address of the router (e.g., 192.168.0.1, etc.), an administrative username and password, a network name or service set identifier (SSID) (i.e., a name that identifies a wireless LAN and may have up to 32 characters), a network password (i.e., security key or passphrase), and a media access control (MAC) address (i.e., a unique identifier assigned to a network adapter or network interface card, often referred to as a physical address). In addition, routers are often initially configured with open encryption so the first time the user powers up the router, it becomes an open access point with no encryption and with a published SSID, allowing anyone with an Internet connection immediate access to any devices connected behind the router. Therefore, properly securing the router during the setup configuration is essential and may require the user to select an encryption protocol such as, for example, Wired Equivalent Privacy (WEP) encryption or Wi-Fi Protected Access (WPA and WPA2) encryption.

Although various tools are available to help configure wireless networks, even most guided device setup programs or wizards ask the user numerous questions and require configuration settings and other substantive information to be provided by the user to properly configure the router. Most users have little understanding of the technical distinctions between identifiers, passwords, usernames, and addresses. For example, users may easily confuse an administrative username and password with an SSID and a network password, thereby complicating the setup process and creating frustration and aggravation on the part of the user. Often, the only solution is for the user to involve a third party with technical knowledge, such as a technical support group of a company that manufactured or sold the router. For small businesses, such a scenario could waste precious resources and valuable time.

Even when a user succeeds in setting up a network with a router and a computer, configuration problems often arise again when the user attempts to add another computer or other electronic device to the network. Adding a device to the network may require the user to again provide configuration settings and other substantive information, such as SSID, network password, encryption information, administrative username, administrative password, and the like. Unless the user recorded the configuration settings and other information during the initial network setup procedure, the same issues that may have occurred during the initial network setup may reoccur during any subsequent attempts to add other devices to the network.

A system for simplifying secure network setup, as outlined in FIG. 1, can resolve many of these issues. In accordance with one example implementation, a router may be provided with an associated network application to setup a secure local network. A setup component of the network application may be executed on a first computer to configure the router and first computer and then to connect the first computer to the router, creating a secure private network. The setup component enables automatic configuration of the router and first computer into a secure private LAN without requiring the user to know or provide information related to router configuration settings, such as network names, usernames, passwords, web addresses, or encryption types for the router. Rather, the setup component may find, know, and/or generate necessary router configuration settings. The setup component may also automatically determine whether the router has been connected to another network, such as the Internet. If there is no Internet connection, the setup component may attempt to remedy the connection problem. Once the user completes the setup of the router and the first computer, the configuration settings may be stored in a computer readable medium, which may be used to configure additional computers for wireless or hardwired connection to the router. In addition, the setup component may install an administrative tool component on the first computer that provides the user with necessary information to connect other electronic devices to the router. Thus, such a system simplifies the setup procedure for secure wireless LANs and minimizes the frustration and time spent by users configuring such networks.

Turning to the infrastructure of FIG. 1, a system and method for simplifying secure network setup may be implemented to achieve a network environment such as example network 100. Computers 120 in network 100 may include any computing devices such as personal computers, laptops, desktops, and other similar programmable computing devices with versatile computing capabilities. Network 100 may also include other electronic devices such as game console 110a, smartphone 110b, and printing device 110c. Other wireless or wired electronic devices 110d or 110e may include, for example, personal digital assistants (PDAs), cameras, digital music players, digital video recorders, computing appliances, other special purpose computing devices, etc. It will be apparent that some electronic devices may have enhanced computing capabilities, such that they would be more accurately described as computers or computing devices. Thus, any electronic device capable of performing functions similar to the computers and computing devices described herein, may be configured in network 100 as described with reference to computers and computing devices in network 100.

In FIG. 1, computers 120 and other electronic devices 110 may be connected to router 130 using any suitable communication medium to facilitate electronic communication between the devices. For example, computer 120b, game console 110a, smartphone 110b, printing device 110c, and other wireless electronic devices 110d may be wirelessly connected to router 130 through a wireless connection (e.g., IEEE 802.11 standards). Computer 120a and other wired electronic devices 110e may be connected to router 130 through a physical wire such as an Ethernet cable. In this embodiment, router 130 may receive wired or wireless electronic communications, typically in the form of packets of data, from one computer 120 or electronic device 110 and direct the packets to another specified computer 120 or electronic device 110 within network 100, thus enabling electronic communication between networked devices within private network 100. In one embodiment, router 130 communicates with the networked devices in network 100 using one or more communication protocols, such as, for example Internet Protocol Suite (TCP/IP), employing the use of a distinct, logical address for each of the networked devices.

Network 100 may also be connected, through router 130, to another private network, a public network, such as Internet 160, or a combination of public and private networks. In the example embodiment shown in FIG. 1, router 130 is connected to Internet link 150 (e.g., a modem), which may be connected to Internet 160 by any appropriate medium including, for example, digital subscriber lines (DSL), telephone lines, T1 lines, T3 lines, wireless, satellite, fiber optics, cable, Ethernet, etc. or any combination thereof. An arrangement as shown in FIG. 1 permits router 130 to route electronic communications from networked devices 110 and 120 in network 100 to devices in other networks, such as Internet 160. Similarly, router 130 may receive electronic communications from Internet 160, or other networks to which network 100 is connected, and route such communications to the specified computer 120 or other electronic device 110 within network 100.

Setup key 140 may provide a network application with a setup component and initial configuration settings to a computer such as, for example, wireless computer 120b, to initiate the secure setup and configuration of router 130 and computer 120b and the wireless connection therebetween. In one embodiment, setup key 140 may be a transportable computer readable medium such as a universal serial bus (USB) flash memory, a compact disc (CD), or the like. After router 130 has been initially configured and is connected to a computer, such as computer 120b, the configuration settings may be stored on setup key 140, if available, or on another computer readable medium, which may then be used to configure additional computers to access router 130. Also, after router 130 and computer 120b have been successfully configured and wirelessly connected, an administrative tool component, which may be part of the network application on setup key 140, may be installed on computer 120b for providing a user with administrative options for network 100. For example, the administrative tool component may offer the user the option to add additional computers or other electronic devices to network 100, configure parental controls on router 130, setup a guest access network through router 130, or manually modify configuration settings of router 130.

It should be understood that while an example network 100 has been shown and described herein, the system and method of the present disclosure may be implemented in any network environment capable of supporting the architecture. Accordingly, the description with reference to network 100 should be not be construed to imply architectural limitations, but rather, should be construed as illustrative.

Figure 2:
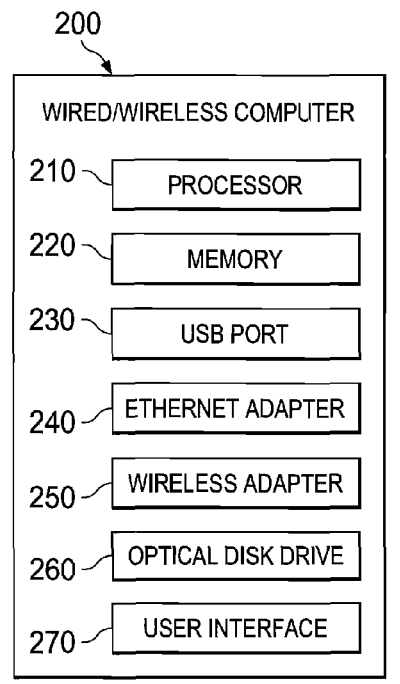
FIG. 2 is a simplified schematic diagram of one embodiment of a computing device accommodating both wired and wireless components, in which embodiments of the system and method of simplifying secure network setup may be implemented.

Turning to FIG. 2, FIG. 2 is a simplified block diagram of an example computer 200 that may be implemented in network 100 according to the present disclosure. As shown in FIG. 2, computer 200 may include a processor 210 operably connected to memory 220, a USB port 230, an Ethernet adapter 240, a wireless network adapter 250, an optical disk drive 260, and a user interface 270. User interface 270 may be a graphical user interface and may include a display screen with suitable input devices such as, for example, a keyboard, a touch screen, a mouse, a touchpad, a trackball, audio input devices, and the like. Ethernet adapter 240 enables computer 200 to be physically connected to a network by a wire such as an Ethernet cable. Wireless network adapter 250 may include suitable transmitting and receiving components, such as transceivers, for wirelessly communicating with a local network. Both Ethernet adapter 240 and wireless network adapter 250 may be configured to communicate with a network, such as network 100, using suitable communication protocols such as, for example, Internet Protocol Suite (TCP/IP). Computer 200 is shown with both Ethernet adapter 240 and wireless network adapter 250 for illustrative purposes only. While one or both hardwire and wireless adapters may be installed inside computer 200 or externally connected to computer 200, only one connection option is required to enable connection of computer 200 to a network, such as network 100.

Not shown in FIG. 2 is additional hardware that may be suitably coupled to processor 210 and other components in the form of memory management units (MMU), additional symmetric multiprocessing (SMP) elements, physical memory, peripheral component interconnect (PCI) bus and corresponding bridges, small computer system interface (SCSI)/integrated drive electronics (IDE) elements, etc. Computer 200 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in computer 200 to appropriately manage the operation of the hardware components therein.

Other electronic devices added to network 100 may have one or more components as described with reference to computer 200 of FIG. 2, in addition to other components not shown in FIG. 2. The components of such devices may be configured to achieve the intended purposes of the particular electronic device, which may or may not differ from computer 200. In addition, other electronic devices may have a different combination of components such as, for example, a printing device without an optical disc drive. Such other electronic devices as referenced in this application, however, need some type of internal or external network interface, such as an Ethernet adapter or a wireless network adapter, for communicating with a router and providing necessary information for network configuration in accordance with embodiments of the disclosure.

Figure 3:
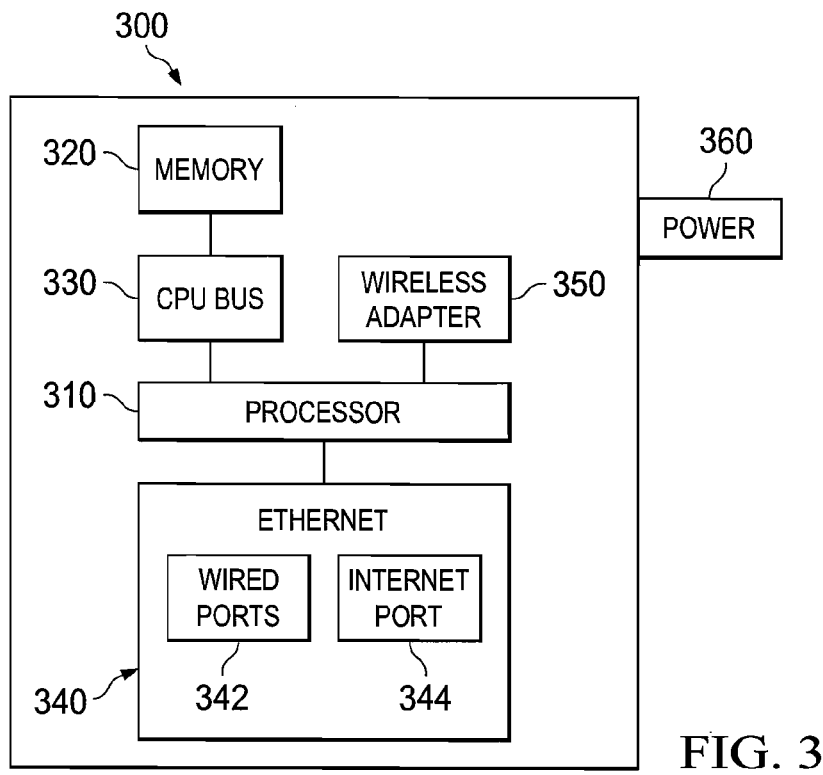
FIG. 3 is a simplified schematic diagram of one example embodiment of a networking device of the system and method in accordance with the present disclosure.

Referring to FIG. 3, a simplified block diagram of an embodiment of a router 300 that may be implemented in network 100 according to the present disclosure is shown. Router 300 may include a processor 310 operably connected to a central processing unit (CPU) bus 330 that may provide access to memory 320. Memory 320 may include a variety of components including random access memory (RAM), read only memory (ROM), flash memory, non-volatile memory, and the like. Processor 310 may be operably coupled to wireless adapter 350 having suitable transmitting and receiving components, such as transceivers, for wirelessly communicating with local networked devices. Ethernet adapter 340 may also provide wired ports 342 for providing a hardwire connection between computers and other electronic devices and router 300. An internet port 344 may enable router 300 to be connected to an Internet link, such as a modem, which communicates with private or public networks through, for example, Internet Service Providers (ISPs), Internet servers with dedicated bandwidth, switches, gateways, other routers, and any other device used to achieve successful electronic communication between router 300 and another network. Router 300 may also include a power connector 360 for providing electrical power to the components therein.

Not shown in FIG. 3 is a serial wide area network interface card (WIC), suitably coupled to Internet port 344, which is a specialized network interface card (NIC) that allows router 300 to connect to a wide area network (WAN) such as the Internet. Also not shown is a Channel Service Unit/Data Service Unit CSU/DSU interface that allows the WIC to communicate with router 300. Router 300 may also include any additional suitable hardware, software, components, modules, interfaces, or objects that facilitate the operations thereof. This may be inclusive of appropriate algorithms and communication protocols that allow for the effective protection and communication of data to both a local network and to other private or public networks outside the local network. Additionally, any suitable operating system, such as Internetwork Operating System (IOS), by Cisco Systems, Inc. of San Jose, Calif., may also be configured in router 300 to appropriately manage the operation of the hardware components therein.

Figure 4:
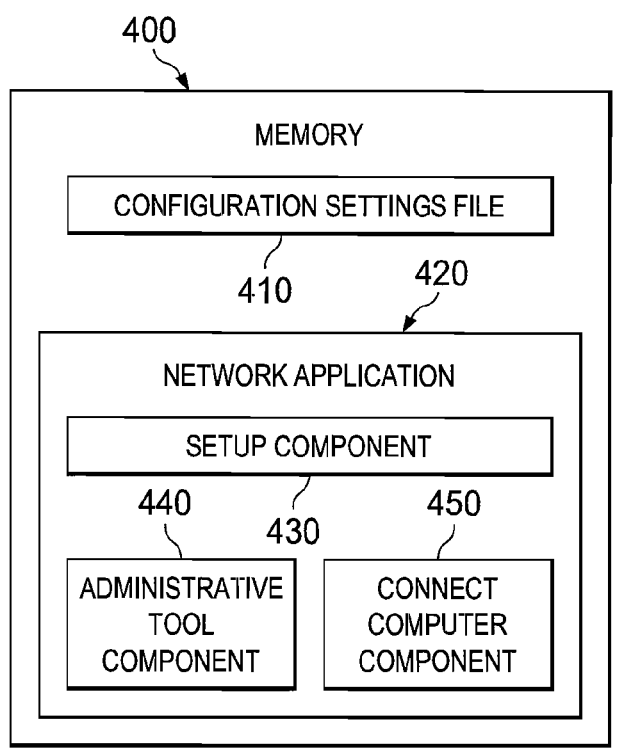
FIG. 4 is a simplified block diagram of one example embodiment of a computer readable medium of the system and method in accordance with the present disclosure.

Turning to FIG. 4, FIG. 4 shows a simplified block diagram of a logical representation of a computer readable medium 400, which may be used as a setup key 140 in network 100 in accordance with embodiments described in the present disclosure. Computer readable medium 400 may contain any type of data storage memory capable of storing data and executable code and capable of being read by a computer. For instance, in some embodiments, computer readable medium 400 may be a Universal Serial Bus flash memory (USB key), a compact disc (CD), or any combination thereof. For example, in some embodiments, multiple setup keys may be used in a network. In one example embodiment, a CD may be used initially to configure a network with a first computer and a common networking device, such as a router, and then a USB key may subsequently be used to store configuration settings for adding new computers to the network. In another example embodiment, a USB key may be used to initially configure a network, and then the new configuration settings may be stored on the same USB key, which may then be used to add new computers to the network. Thus, in some embodiments, computer readable medium 400 may be read-writable, such that data can be written to it by a computer or other electronic device.

As shown in one embodiment in FIG. 4, computer readable medium 400 may include a configuration settings file 410 and a network application 420. Network application 420 may, in one example embodiment, include a setup component 430, an administrative tool component 440, and a connect computer component 450. Network application 420 may be written in any number of programming languages capable of performing operations necessary to implement an embodiment of the present disclosure. In one embodiment, a combination of C, C++, Objective C, and Objective C++ programming languages is used. Configuration settings file 410 may be encoded using, for example, Extensible Markup Language (XML) format. In one embodiment, configuration settings file 410 may include a mode element indicating a state of computer readable medium 400 and an appropriate execution mode (e.g., Connect Mode for 1$^{st}$ computer, Connect Mode for n$^{th}$ computer where n>1, and Tool Mode) for network application 420. Thus, when network application 420 is launched, the components of network application 420 may be executed as indicated by the value of the mode element. An alternative embodiment may implement setup component 430, administrative tool component 440, and connect computer component 450 as separate applications. In another alternative embodiment, configuration settings file 410 and/or network application 420, or selected components thereof, could be provisioned in another component or element such as, for example, a wireless network adapter, which could be provided to a computer to be configured in network 100. In yet another embodiment, configuration settings file 410 and/or network application 420, or selected components thereof, could be received or downloaded from a web server in order to provide this system to simplify secure network setup.

In accordance with embodiments in the disclosure, network application 420 and configuration settings file 410 may guide a user to securely setup and configure a local area network (LAN) having a common networking device, such as a router, and a first computer with either a wireless or hard-wired connection. In one embodiment, this setup and configuration may be accomplished without requiring any router configuration settings from the user, such as SSID, network password, encryption type, administrative username, administrative password, etc. Setup component 430 discovers an unconfigured router, reconfigures wireless settings on the router, configures the wireless settings on the computer, connects to the router, establishes a wide area network (WAN) connection, updates computer readable medium 400 with new configuration settings, and installs administrative tool component 440 on the computer after the setup and configuration has been successful. Once the initial configuration of the router has been completed, configuration settings file 410 may be updated to indicate that an initial setup and configuration of the router and first computer has been completed. In such an embodiment, connect computer component 450 may then be executed to configure additional computers to communicate with the router by either a wireless or hardwire connection using the updated configuration settings stored in configuration settings file 410 of computer readable medium 400.

In one alternative embodiment, the computer readable medium may be configured as a read-only medium such as, for example, a read-only compact disc (CD). In this embodiment, the computer readable medium may be manufactured such that configuration settings file includes new configuration settings such as a new network password, a new network identifier, and a new administrative password. These settings could be serialized or otherwise uniquely created for each computer readable medium. The new configuration settings may be used during the setup process to configure the router with the new configuration settings, and to set the wireless profile on the computer such that the computer can wirelessly connect to the router. Thus, in this embodiment, the computer readable medium may be read-only as it would not need to be updated with other new configuration settings.

When connecting a new computer to the router in this alternative embodiment, a determination may first need to be made as to whether the router has been previously configured with another computer. This may be accomplished, for example, by using the new configuration settings to attempt to access the router. If the router is found and a connection is established, then the software may assume the router has been previously configured and, therefore, will only need to perform a process such as process 2400 shown in FIG. 24 for adding a new computer to a previously configured network. If the router is not found with the new configuration settings, however, then a search may be made for a router with a predetermined SSID (e.g., "CISCOXXXXX") as previously described herein. If a router is found with this predetermined SSID, then the software may assume the router has not been previously configured, and may configure the router and the computer, using a wireless network configuration process such as process 600 shown in FIGS. 6A and 6B, but may omit the steps of generating new configuration settings and storing such settings on the computer readable medium.

Turning now to FIGS. 5-26, FIGS. 5-26 include flowcharts of user actions combined with network application 420, including setup component 430, administrative tool component 440, and connect computer component 450, and selected screen displays associated with such components, which could be displayed to a user on a user interface, such as user interface 270 of computer 200, during setup and configuration of a router, a computer, and any additional computers and other electronic devices in accordance with embodiments of the present disclosure. In addition, FIG. 14 includes various stages of an exemplary configuration settings file 410 during the processing of network application 420. For ease of reference, FIGS. 5-26 will be described herein with references to computer 200, router 300, computer readable medium 400, and their associated components, elements, and modules, although various other devices, components, elements, modules and the like may be used to implement the system and method shown and described with reference to FIGS. 5-26.

Figure 5:
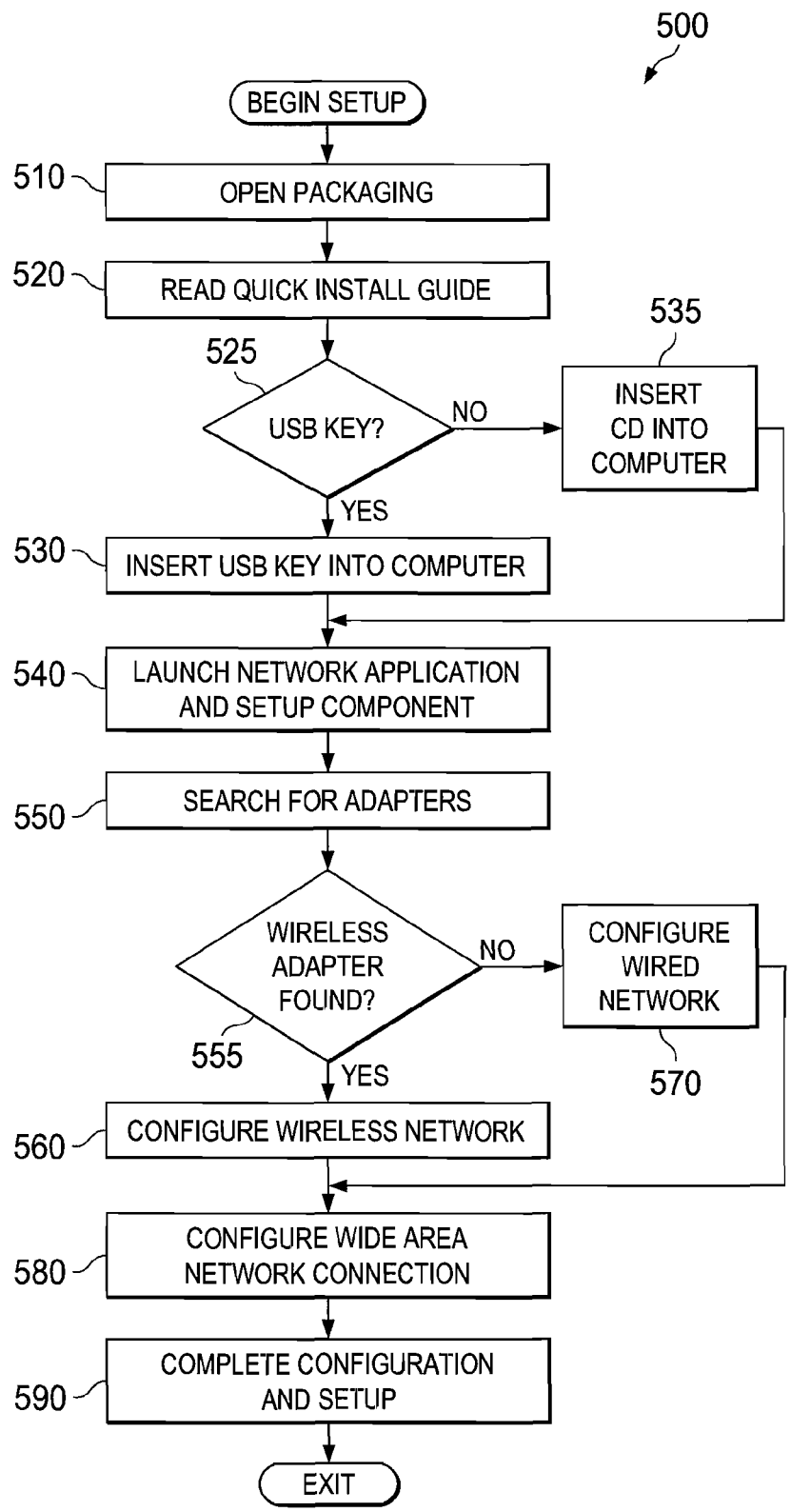
FIG. 5 is a high level flowchart illustrating a series of example steps of a secure network setup flow associated with the system and method in accordance with embodiments of the disclosure.

FIG. 5 is a high-level flowchart that shows the overall flow 500 of one embodiment of a method of simplified secure network setup, including a basic flow of setup component 430. In accordance with one embodiment, in step 510 a user may begin by opening up packaging of a networking device, such as router 300, and a setup key, such as computer readable medium 400. In step 520, the user may read a Quick Install Guide that directs the user to insert the computer readable medium provided into a first computer to be configured, such as computer 200. As shown in step 525, if the computer readable medium in the packaging is a USB key, then the quick install guide may instruct the user to insert the USB key into the computer in step 530. However, if a CD is provided, then the quick install guide may instruct the user to insert the CD into the computer in step 535. It will be apparent that the initial configuration settings and applications provided by a USB key or a CD could, alternatively, be downloaded from a web server, or otherwise provided to the computer. In addition, while some embodiments may presume that the computer to be configured includes an integrated optical disc drive 270 or USB port 230 as shown in computer 200, such interfaces may be separately housed but operably connected to the computer.

Once computer readable medium 400 has been inserted or otherwise connected to the computer, network application 420 may be launched in step 540. In certain embodiments, network application 420 may be automatically launched, such as, for example, using autorun software technology in Microsoft Windows XP operating system. In other embodiments, the user may be prompted in a dialog box with options for network application 420, and therefore, the user may have to select an option to run or launch network application 420. In one embodiment, if the mode element of configuration settings file is "Connect" for a 1$^{st}$ computer, then network application 420 knows to begin setup component 430. In step 550, setup component 430 may search for available network adapters on the computer. This search may be accomplished using operating system application programming interfaces (APIs). In step 555 a determination is made as to whether a wireless network adapter has been found. If a wireless network adapter has been found, then in step 560 setup component 430 configures a wireless network. However, if a wireless adapter is not found in step 555, then setup component 430 may configure a wired network in step 570. Thus, in one embodiment, setup component 430 defaults to configuring a wireless connection even if the computer includes both wired and wireless adapters. In addition, although not specifically shown in FIG. 5, if no adapters are found on the computer, then setup component 430 will provide appropriate help and/or error message screen displays to the user, and no configuration steps will be taken until an adapter is found.

In step 580 of FIG. 5, once a wireless or wired network has been established, setup component 430 may establish a wide area connection (WAN) to another network, such as, for example, the Internet. In step 590, after a WAN connection has been established, setup component 430 may then complete the setup and configuration of the computer and the router. Such completion functions may include installing administrative tool component 440 in the computer, turning on administrative functions such as parental controls and guest access on the router, and updating computer readable medium 400 or creating a new one.

Figure 6A:
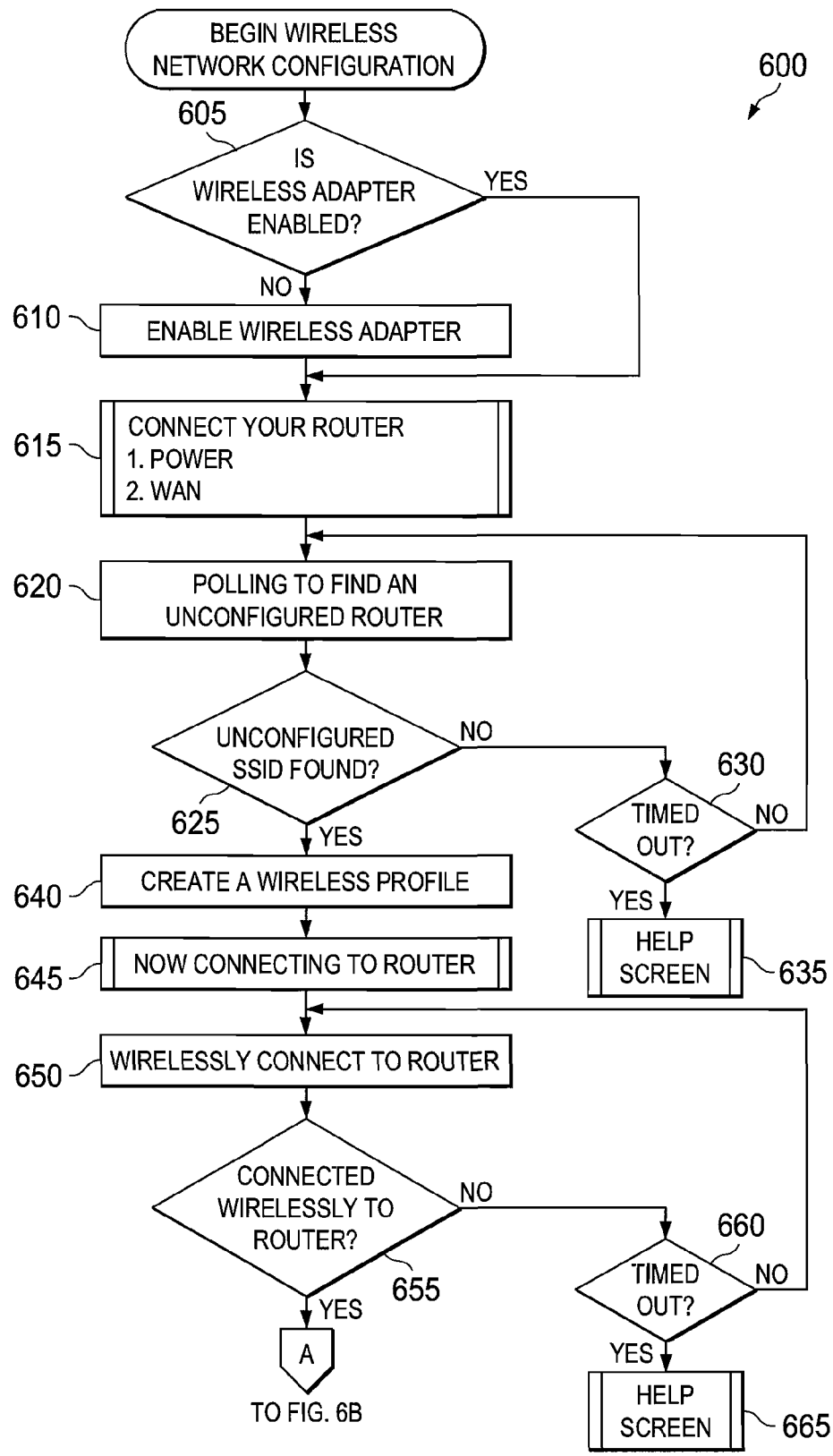
FIGS. 6A and 6B show a flowchart illustrating more detailed steps of the configure wireless network step of FIG. 5 in accordance with embodiments of the disclosure.
Figure 6B:
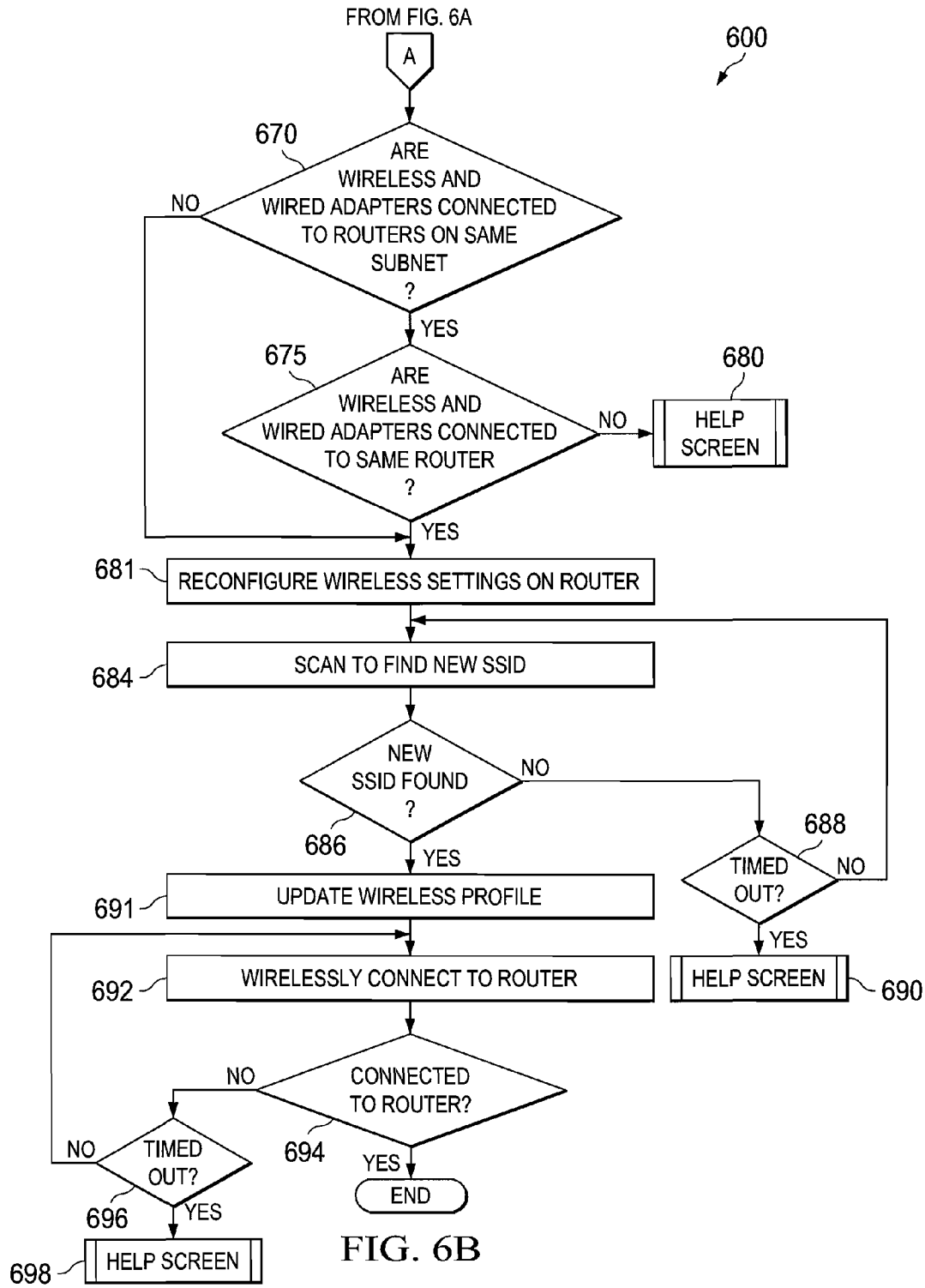
Figure 7:
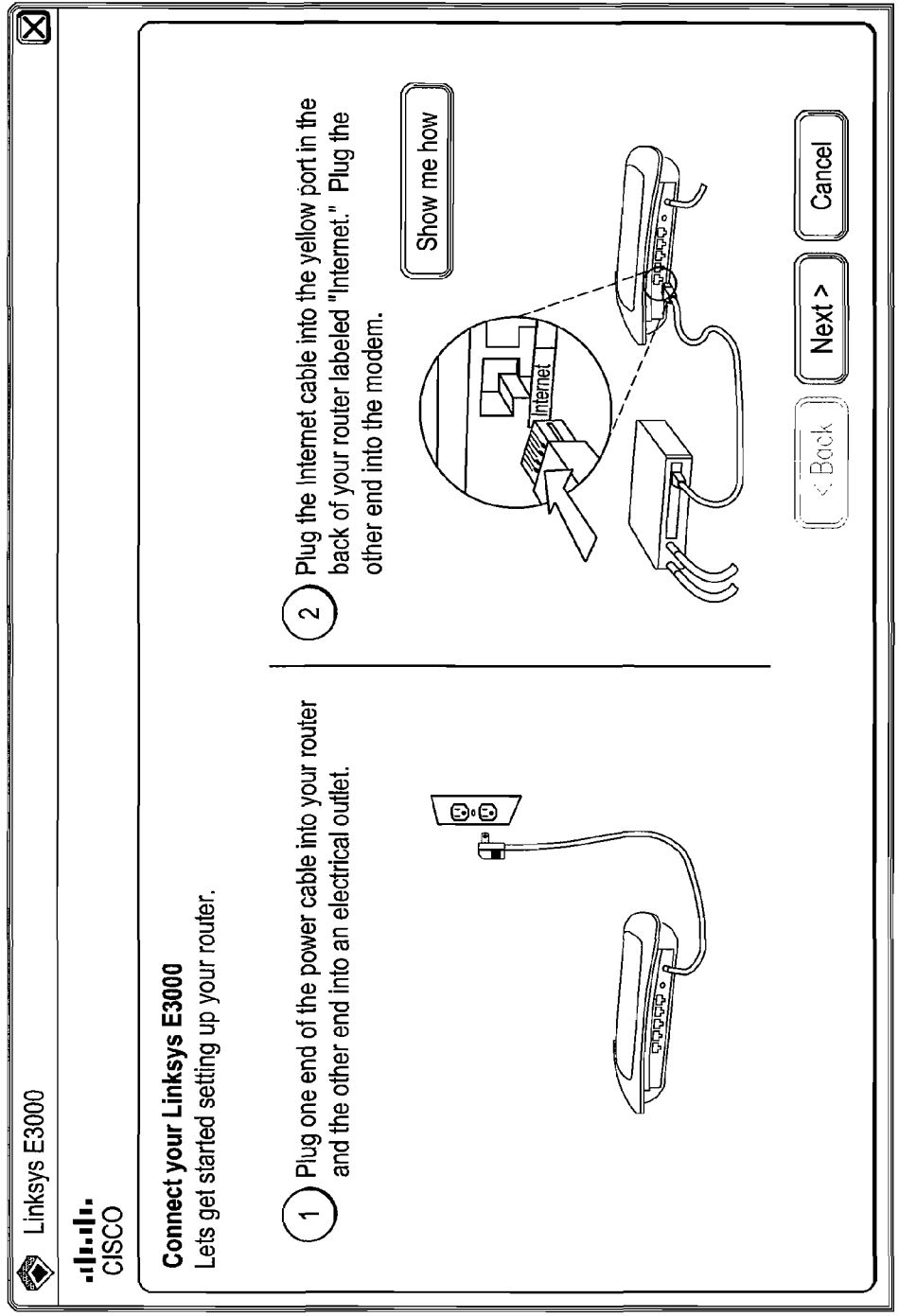
FIG. 7 shows an example connect your router screen display in accordance with example embodiments of the disclosure.

FIGS. 6A and 6B show a flowchart showing a more detailed process 600 of step 560 to configure a wireless network when a wireless network adapter, such as wireless adapter 250, has been found. With reference to FIG. 6A, in step 605, a determination is made as to whether the wireless adapter is enabled, and if necessary, it may be automatically enabled in step 610. This determination and enablement may be accomplished using operating system APIs, which may occur in the background without any user interaction. In one embodiment, the software determines which adapter is the fastest and enables that adapter. Once the wireless adapter is enabled, in step 615 a connect your router screen, such as the screen shown in FIG. 7, is displayed on a display screen, such as user interface 270 of computer 200. The connect your router screen of FIG. 7 offers two instructions to the user. First, the user is instructed to plug in the router to a power outlet. Second, the user is instructed to attach one end of an Internet cable to an Internet port, such as Internet port 344 of router 300, and to attach an opposite end of the Internet cable to a modem. Once the user has completed these manual steps, the user may click on the NEXT user interface control button to continue the setup processing.

As shown in step 620 of FIG. 6A, polling may begin to find an unconfigured router within a wireless connectivity range. In one embodiment, the polling may include using an operating system of the computer to search for a router having a particular SSID such as, for example, an SSID with a predetermined format "CISCOXXXXX", where "XXXXX" corresponds to the last five numbers of a character string (e.g., serial number) assigned to the router. This predetermined SSID format may be preset on unconfigured routers, such that detection of this SSID format indicates that the router is in an unconfigured state. The operating system may use wireless APIs for detecting an available SSID within a wireless connectivity range. In step 625, a determination is made as to whether an SSID having the predetermined format (e.g., "CISCOXXXXX") is found, thereby indicating the router is in an unconfigured state. If an SSID with the predetermined format is not found, then a time out procedure is used in steps 630 and 635. In step 630, a determination is made as to whether polling has reached a maximum time limit, and if it has not, flow loops back to step 620 to continue polling to detect an unconfigured router. However, if a maximum time limit has been reached in step 630, then a display screen offering assistance to the user may be displayed in step 635. If an unconfigured router having an SSID in the predetermined format (e.g., "CISCOXXXXX") is found in step 625, then in step 640, a wireless profile is created in the computer. A wireless profile may be created in a memory element, such as memory 220, of the computer by storing proper metadata into native wireless configurations for the existing operating system of the computer instructing the operating system to establish a persistent connection with the detected unconfigured router having the predetermined SSID format.

Figure 8:
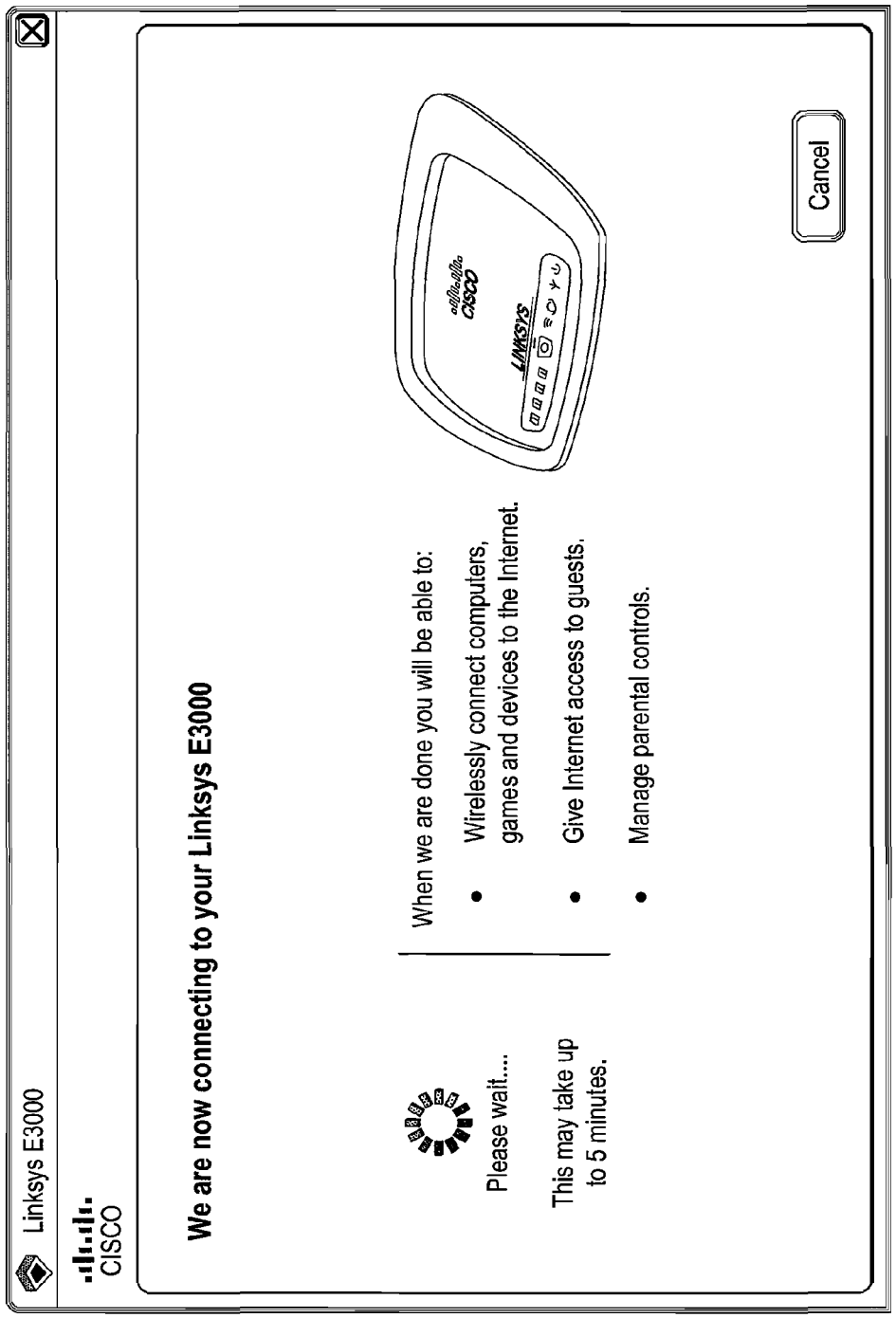
FIG. 8 shows an example now connecting to your router screen display in accordance with example embodiments of the disclosure.

In step 645 of FIG. 6A, a now connecting to router screen, such as the screen shown in FIG. 8, may be displayed to the user. In step 650, the operating system uses the wireless profile stored on the computer to attempt to wirelessly connect to the router through wireless network adapter. In step 655, tests are performed to determine whether a wireless connection has been made between the computer and the router. The tests validate that the operating system of the computer is connected to the expected unconfigured router and that the operating system has received an IP address from the unconfigured router. If the determination in step 655 indicates that the computer is not wirelessly connected to the expected unconfigured router, then a time out procedure is used in steps 660 and 665. In step 660, a determination is made as to whether attempts to wirelessly connect have reached a maximum time limit, and if not, flow loops back to step 650 to continue attempting to wirelessly connect to the router. However, if a maximum time limit has been reached in step 660, then a display screen offering assistance to the user may be displayed in step 665.

If the determination in step 655, however, indicates that the computer has successfully connected wirelessly to the router, then flow passes to FIG. 6B where a collision detection process may be performed in steps 670 through 685 if both wireless and wired adapters exist on the computer. A check is made in step 670 as to whether the wireless and wired adapters are connected to routers on the same subnet. For example, if the wireless adapter is communicating with a router on subnet 192.168.1.1 and the wired adapter is connected to a router on subnet 192.168.0.1, then no conflict exists and wireless network configuration process 600 continues. However, if the wireless and wired adapters are connected to a router on the same subnet (e.g., 192.168.1.1), then a check is performed in step 675 to determine whether it is the same router. If the wired and wireless adapters are communicating with the same router, then no conflict exists and wireless network configuration process 600 continues. However, if the wired and wireless adapters are communicating with different routers assigned to the same subnet, then the operating system may not be able to distinguish between the routers and a conflict may occur. Therefore, if it is determined in step 675 that the wireless and wired adapters are connected to different routers, a help screen may be displayed to the user in step 680 to assist the user in resolving the conflict so that wireless configuration can be completed.

After the connection has been successfully made to the unconfigured router, and any possible wireless and wired conflicts have been resolved, flow passes to step 681 where wireless settings are reconfigured on the router. The process 600 may gain administrative access to the router, using a known default password, in order to change the router configuration settings. In one embodiment, APIs may be used to perform the changes to the router settings. The SSID of the router, which is initially set to the predetermined format (e.g., "CISCOXXXXX") as previously described herein, may be changed to a new SSID, which may be automatically generated using a random SSID generation algorithm. In one example embodiment, the new SSID could be a human readable random string including an adjective and a noun such as, for example, "ShortWillow." In addition, the router may not be provided with open encryption, but rather, may be provided in a setup mode that includes enabled encryption by default, such as WPA and WPA2. A new network password may be generated using a password generation algorithm. In addition, a new administrative password may be generated using the password generation algorithm. The SSID and passwords may then be changed to the new SSID and passwords in the router. The combination of enabled encryption, a unique SSID generated by the setup component, and network and administrative passwords generated by the setup component provides a fully encrypted, fully secure, and fully locked down router, without requiring any configuration settings to be provided by the user during the setup process.

After the router settings have been reconfigured, a new wireless connection to the router is made using the new router settings. In step 684, the operating system of the computer scans for the new SSID. If the new SSID is not found in step 686, then a time out procedure is used in steps 688 and 690. In step 688, a determination is made as to whether polling for the new SSID has reached a maximum time limit, and if it has not, flow loops back to step 684 to continue polling to detect the new SSID. However, if a maximum time limit has been reached in step 688, then a display screen offering assistance to the user may be displayed in step 690. Referring back to step 686, however, if the new SSID is found, then the wireless profile in the computer is updated in step 691. The updated wireless profile may include, among other things, the new SSID, the new network password, and the encryption security type. After the wireless profile has been updated, the operating system attempts to wirelessly reconnect to the router through the wireless network adapter in step 692. In step 694, tests are again performed to determine whether a wireless connection has been made between the computer and the router, as previously described herein. If the determination in step 694 indicates that the computer is not wirelessly connected to the configured router with the new SSID, then a time out procedure is used in steps 696 and 698. In step 696, a determination is made as to whether attempts to wirelessly connect have reached a maximum time limit, and if not, flow loops back to step 692 to continue attempting to wirelessly connect to the configured router. However, if a maximum time limit has been reached in step 696, then a help screen offering assistance to the user may be displayed in step 698. With reference again to step 694, if the wireless connection has been successfully made to the router using the new SSID, then the wireless network configuration process 600 ends.

Figure 9:
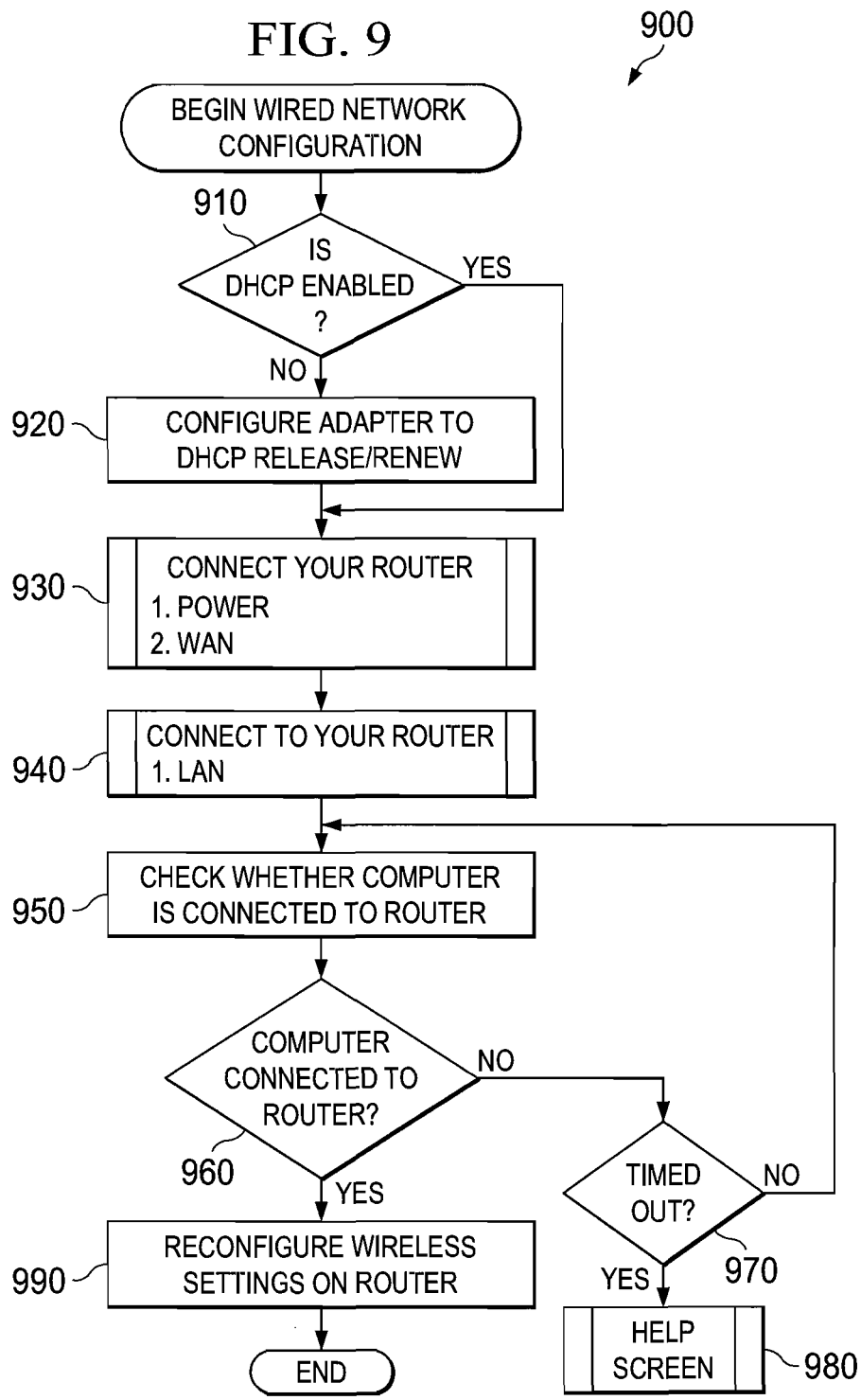
FIG. 9 is a flowchart illustrating more detailed steps of the configure wired network step of FIG. 5 in accordance with example embodiments of the disclosure.
Figure 10:
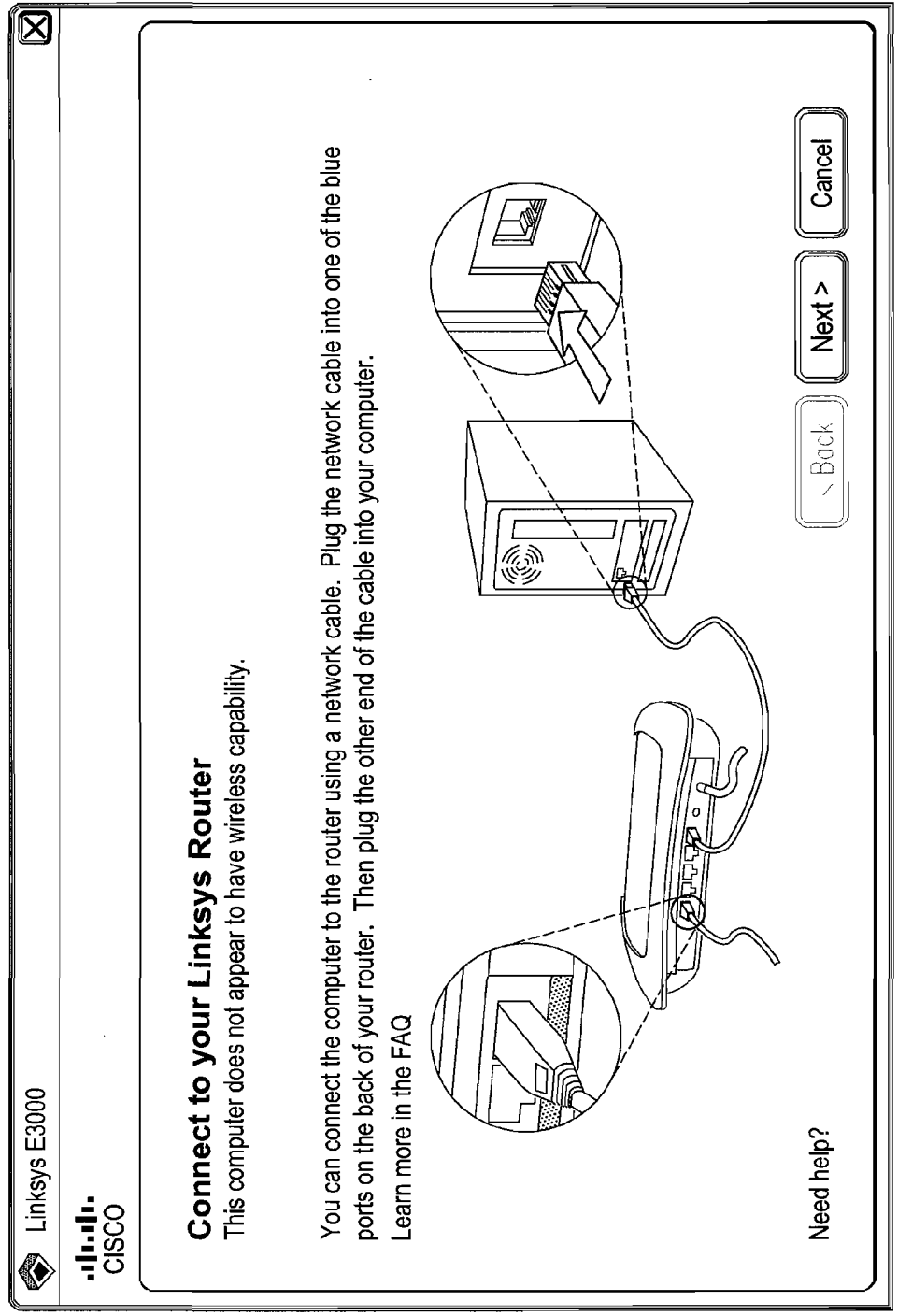
FIG. 10 shows another example connect your router screen display in accordance with embodiments of the disclosure.

Turning to FIG. 9, FIG. 9 is a flowchart showing a more detailed process 900 of step 570 to configure a wired network when a wired network adapter, such as Ethernet adapter 240, is found. Process 900 begins by determining in step 910 whether the Ethernet adapter is enabled with Dynamic Host Configuration Protocol (DHCP). If the Ethernet adapter is not DHCP enabled, then in step 920, the Ethernet adapter settings are configured to DHCP release/renew. In step 930, a connect your router screen is displayed, which may be the same or similar screen as shown in FIG. 7, which is displayed during process 600 for wireless network configuration. Once the user has completed the manual steps to connect the router as instructed on the screen of FIG. 7 (i.e., plugging in the router to a power outlet and connecting one end of an Internet cable to an Internet port in the router and an opposite end to a modem), the user may click on the NEXT user interface control button on the screen display. After the user clicks the NEXT button, step 940 displays a connect to your router screen, such as the screen display shown in FIG. 10. The screen in FIG. 10 shows the user how to connect the computer to the router using a network cable. In addition, further instructive screens may be displayed giving step by step directions and pictorials on how to disconnect existing cables between the computer and an upstream Internet connection (e.g., cable modem, DSL modem, fiber optics modem, gateway, other router, etc.) and appropriately reconnect the cables to the new router. Such additional instructive screens may be displayed if the user clicks a LEARN MORE user interface option on the screen of FIG. 10. Once the user finishes the manual connections to connect the computer to the router with a network cable, the user may click the NEXT user interface control button on the screen of FIG. 10.

As shown in step 950 in FIG. 9, process 900 then checks whether the computer has a network connection. If a network connection is detected, then a determination is made as to whether the connection has been made to an expected unconfigured router. In one embodiment, the expected unconfigured router is determined based on whether an SSID of the router has a predetermined format (e.g., "CISCOXXXXX"). The SSID is checked so that the wireless settings on the router can be configured for any future wireless connections that may be made. If it is determined that the computer is not connected to an expected unconfigured router in step 960, then a time out procedure is used in steps 970 and 980. In step 970, a determination is made as to whether waiting for a connection to an unconfigured router has reached a maximum time limit, and if it has not, flow loops back to step 950 to continue checking whether connection has been made to an unconfigured router. However, if a maximum time limit has been reached in step 970, then a display screen offering assistance to the user may be displayed in step 980. If it is determined that the computer is connected to an unconfigured router having an SSID in the predetermined format (e.g., "CISCOXXXXX") in step 960, then flow proceeds to step 990 to reconfigure wireless settings in the router, as previously described herein. The wireless settings are reconfigured to permit secure connection of any wireless devices subsequently connected to the router. After the wireless settings are reconfigured in the router, process 900 ends.

Figure 11B:
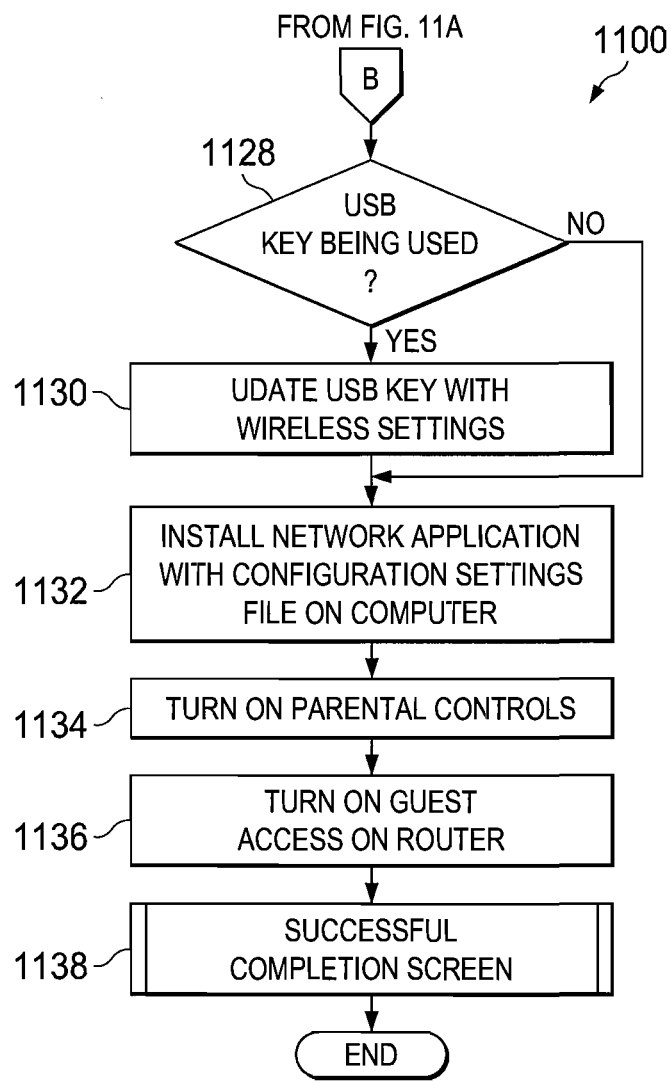

FIGS. 11A and 11B show a flowchart illustrating a more detailed process 1100 of step 580 to configure a wide area network connection and step 590 to complete configuration and setup. FIGS. 11A and 11B are performed after a wireless connection or a wired connection has been successfully made between the computer and the router. At step 1102 a test is performed to determine whether there is Internet connectivity to the router. In one embodiment, several tests may be performed, such as, for example, a Domain Name System (DNS) lookup, a TCP ping, and an HTTP Head or Get Request to a known Uniform Resource Identifier (URI). These tests are performed to determine whether IP configuration and DNS entries are valid, whether metadata about the network connection is accurate, and whether a valid connection can be made to the known URI.

If the router is determined to not have Internet connection at step 1104, because the settings are not valid or the URI has not been successfully contacted (e.g., HTTP Head or Get Request receives a response status code indicating an error or receives no response at all), then several checks may be performed to attempt to resolve the Internet connection problem. First, in step 1140 a call may be made to the router using any suitable protocol to get the WAN status. In one embodiment, the status call may be performed using HNAP protocol, which is described in detail in U.S. Pending patent application Ser. No. 11/457,783, filed Jul. 14, 2006, naming Hopmann et al. as inventors, and published on Jun. 7, 2007 as U.S. Publication No. 2007/0130286 A1, which is herein incorporated by reference in its entirety. It will be apparent, however, that any other suitable protocol may be used to obtain WAN status information. At step 1142, the WAN status is checked to determine whether the router indicates it is connected to something. If the router does not indicate any upstream connection, then a time out procedure is used in steps 1144-1148. In step 1144 a determination is made as to whether it is the first time an upstream cable link was not found, and if it is, then a wait time is activated in step 1146. After the wait time has completed, flow loops back to step 1140 to make HNAP protocol calls to get WAN status. However, if it is not the first time an upstream cable line was not found in step 1144, then a display screen offering assistance to the user may be displayed in step 1148. Referring again to step 1142, if the router indicates an upstream connection, then a second test is performed at step 1150 to determine Internet connectivity. If there is still no connection, then a repair attempt may be made to repair the Internet connection. Once the repair attempt is complete, another test is performed to determine if the repair was successful to restore Internet connectivity.

At step 1152, if the status calls still indicate there is no Internet connectivity, then the status information received from the HNAP protocol call is evaluated at step 1154 to determine what type of Internet connection the router should have. Process 1100 may attempt to resolve at least three possible errors: Double Network Address Translation (double NAT), Point-to-Point Protocol over Ethernet (PPPoE) connection type, and Media Access Control (MAC) address problem. In the case of a MAC address problem, some cable Internet Service Providers (ISPs) may lock their Internet connection against one MAC address for an Internet connection. Therefore, if the router is inserted between a computer with the particular MAC address and the ISP, then the ISP will not recognize and communicate with the new router. Therefore, if it is determined in step 1154 that the IP connection type is DHCP, then flow passes to step 1162 to determine whether the network adapter of the computer began as a public IP address. If it did not, then the problem is not a MAC address problem and a help screen may be displayed to the user in step 1166. However, if the adapter began as a public IP address, then flow passes to step 1164 and the MAC address is cloned. Specifically, the MAC address of the network adapter is copied to the router, so that the ISP may continue to believe it is communicating with the original network adapter. Flow then passes to step 1168 where Internet connectivity is tested again.

Referring again to step 1154, if it is determined that the IP connection type is PPPoE, then flow passes to step 1158 and a user interface screen is displayed to allow the user to enter their PPPoE credentials, such as a username and password, required by the particular ISP. Once these credentials have been entered, they are pushed into the router in step 1160 and flow passes to step 1168 to test for Internet connectivity again.

Referring again to step 1154, if it is determined that the router is in a double NAT configuration then flow passes to step 1156 to set the router to another subnet. This could occur if a user connects the router to another router that is connected to the modem rather than connecting the router directly to the modem. NAT is a technique that hides an entire address space, such as network addresses of devices connected to a private LAN, behind a single IP address, such as a public IP address assigned to a router connected to the LAN. In outgoing IP packets (i.e., packets received from the devices connected to the router), the router may use translation tables to map the "hidden" addresses of the originating devices into a single address, which is written in the outgoing packets so that they appear to originate from the router. Incoming response packets are mapped back to the originating IP address using the translation tables. In one embodiment, determining whether a double NAT configuration exists includes receiving a WAN IP address from the router and determining whether it is a loopback address (e.g., 127.0.0.1). If the router WAN IP address is the loopback address, then there is a conflict on the router's default IP address (e.g., 192.168.1.1). The router is assumed to be connected upstream to another router, and therefore, in a double NAT configuration. In this scenario, flow passes to step 1156 and the router being configured is set to another subnet (e.g., 192.168.0.1), in order to avoid conflict with the upstream router. Flow then passes to step 1168 to perform another test for Internet connectivity. The communication with the router may, in one embodiment, be achieved using the HNAP protocol.

With reference to step 1154, if the IP connection type is something other than DHCP, PPPoE, or a double NAT connection, then flow may pass to step 1166 where a help screen is displayed to assist the user in determining why there is no Internet connectivity. Similarly, if the error processing for DHCP, PPPoE and double NAT is performed and it is determined in step 1170 that there is still no Internet connectivity after testing for it in step 1168, then flow may pass to step 1166 where a help screen is displayed. It will be apparent that different help screens may be displayed depending on the particular Internet connection type and problems arising during the attempts to establish an Internet connection.

Figure 12:
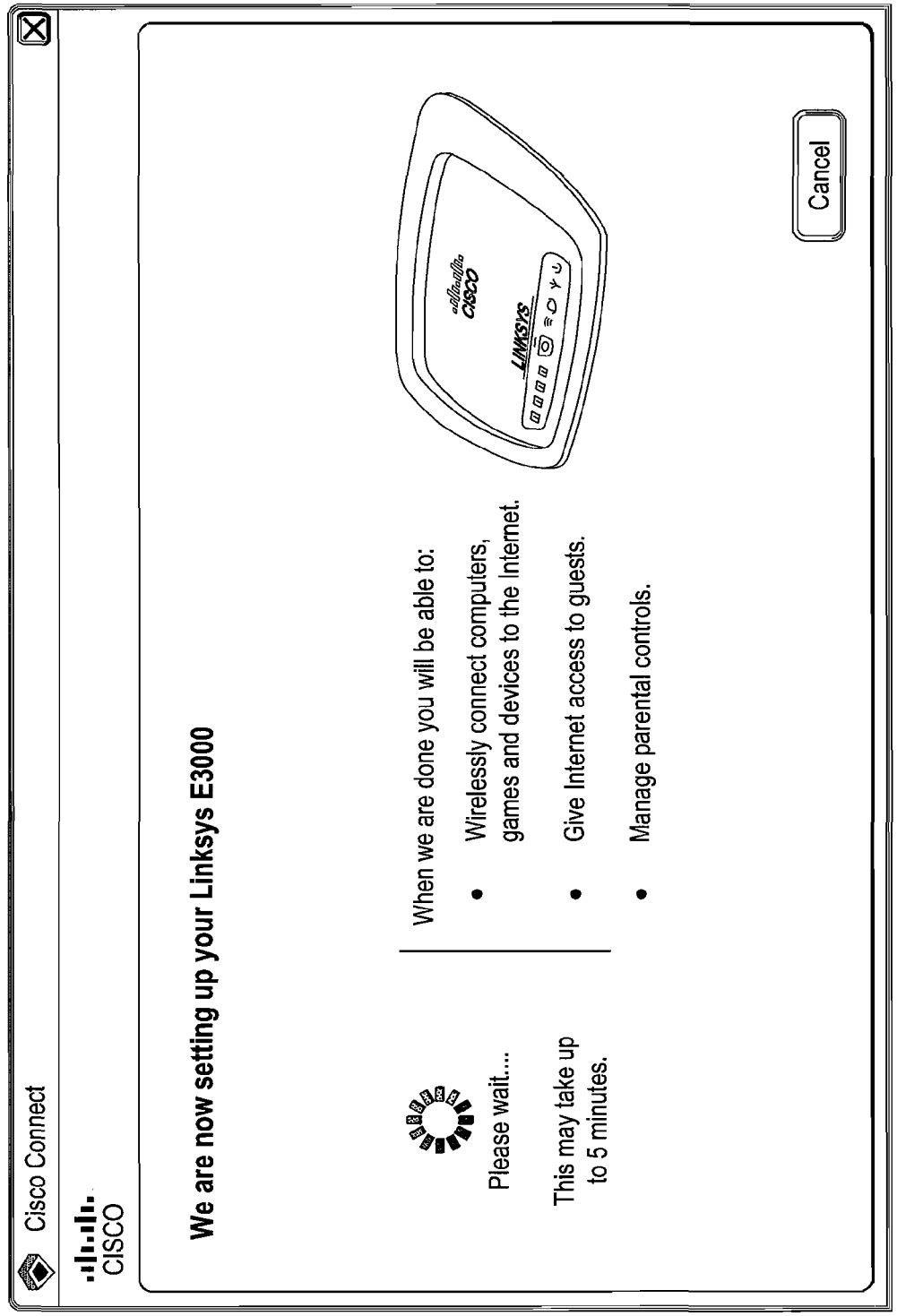
FIG. 12 shows an example setting up router screen display in accordance with embodiments of the disclosure.

Once Internet connectivity has been established, either the first time it was tested at step 1102, or at step 1152 or 1168 after various error processing has occurred, a screen may be displayed in step 1106, such as the screen shown in FIG. 12, indicating that the setup process is now setting up the router. Flow passes to FIG. 11B where the configuration and setup is completed. A check may be performed at step 1128 to determine whether computer readable medium 400 is a USB key. If a USB key is being used for the setup, then in step 1130, the USB key may be updated with the wireless configuration settings and other information related to the router. At step 1132, network application 420 and configuration settings file 410 may be installed on the computer from computer readable medium 400, which is inserted in or otherwise in communication with the computer. This installation enables a user to launch administrative tool component 440, which is part of network application 420, on the computer. In another embodiment, network application 420 or a separate administrative tool component may be downloaded from a web server and installed on the computer if the installation occurs after the network setup has been successfully completed and the computer has access to the Internet.

Referring to step 1134 of FIG. 11B, parental control options may be enabled on the router. In one embodiment the HNAP protocol may be used to provide settings to the router and to configure the router to communicate with a third party on another network such as, for example, the Internet. The third party may provide ratings and other information related to computer safety and content (e.g., age-appropriate content, malware, phishing, pharming, etc.) for any URIs accessed by the router. When enabling the parental controls on the router, in one example embodiment, only the computer safety portion (e.g., malware, phishing, pharming, etc.) is initially activated. After setup has been successfully completed, however, the user may then configure additional parental controls as desired. Thus, during the router configuration and setup, the router is configured with computer safety controls to minimize malware attacks (e.g., viruses, Trojans, etc.) without requiring any configuration settings or other substantive information from the user during the setup process.

Figure 13:
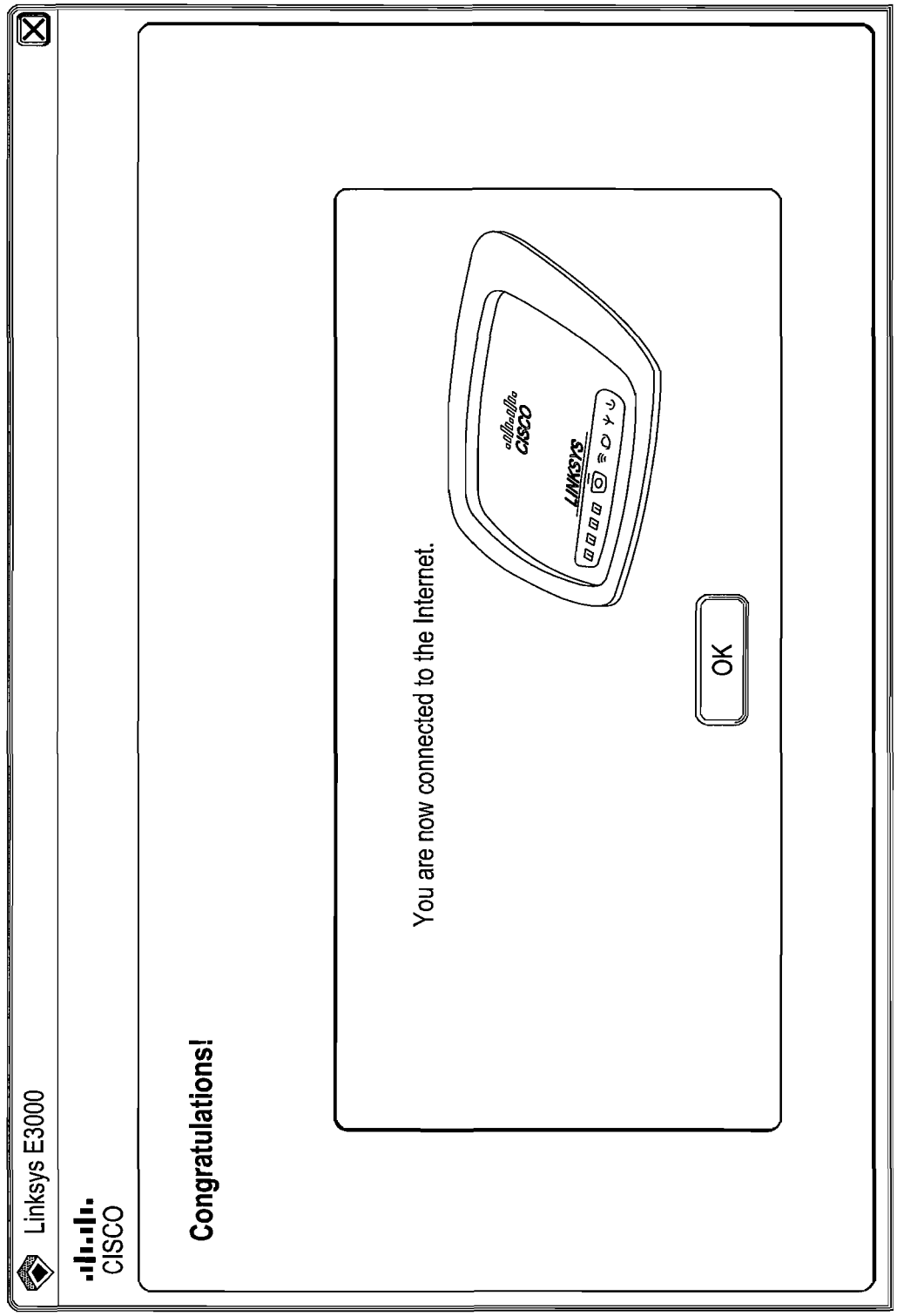
FIG. 13 shows an example successful setup completion screen display in accordance with embodiments of the disclosure.

With reference to step 1136 in FIG. 11B, guest access options may also be enabled on the router to allow authorized guests to access the Internet through the router on a separate guest network, having a separate SSID and a separate wireless network password. Such a configuration could help minimize security risks for the host network when outsiders or guests are allowed access to the router. In one embodiment, a guest network may be configured by dividing the wireless radio in half to get one physical radio and two soft radios. A new SSID and guest password may be generated for the guest network. This may be accomplished using HNAP protocol and the same API used to configure the SSID for the host network. In one embodiment, the guest SSID will be the same as the host network SSID followed by "-guest" and the guest password may be generated using the password generation algorithm used for generating the host network password. In one embodiment, the configuration process of a guest network may be performed without any configuration settings or other substantive information being provided by the user setting up the host network. Accordingly, a guest network is available for use as soon as the network setup has been successfully completed. After the guest access has been enabled in the router, a screen may be displayed to the user indicating a successful setup has been completed as shown in FIG. 13.

Turning now to FIG. 14, FIG. 14 shows an example scenario of various stages of configuration settings file 410 of FIG. 4, during network application 420 processing. Each of the various stages of the configuration settings file example scenario employs an XML encoded file format. Initial XML file 1410 shows a first stage of configuration settings file 410 in the example scenario, which may be stored on computer readable medium 400, such as a USB key or a CD, prior to configuring a network (e.g., factory settings). The model name of the corresponding router to be configured may be encoded and the mode element (DefaultMode) may be set to "Connect" to indicate the state of computer readable medium 400. With no other encoded configuration settings, the state is recognized as the Connect Mode for setup of a first computer. Thus, when network application 420 is launched and reads XML file 1410, it knows to execute setup component 430 to configure a network with a router and a first computer.

Configured XML file 1420 is a second stage of configuration settings file 410 in the example scenario, which may be stored on computer readable medium 400 (or on a new computer readable medium provided by the user) after a network has been configured with a first computer and a router. XML file 1420 may also be stored on the original or a new computer readable medium when a user launches administrative tool component 440 after it has been installed on a computer, as will be further discussed herein. Configured XML file 1420 may include a new wireless SSID, a new wireless (network) password, a new administrative password, and the serial number of the router. The mode element is set to "Connect" and a setup indicator (IsAlreadySetUp) is set to "true" so that the state of computer readable medium 400 will be recognized as Connect Mode for setup of an $n^{th}$ computer, where n>1. This mode indicates that a first computer has already been configured with the router, and therefore, when computer readable medium 400 is inserted in a computer, network application 420 knows to execute connect computer component 450 to configure a new computer to connect to the existing network.

Installed XML file 1430 is a third stage of configuration settings file 410 in the example scenario, which may be stored on the computer with administrative tool component 440, which is part of network application 420. With the exception of the mode element, the configuration settings in installed XML file 1430 may be the same as in configuration XML file 1420. The mode element in installed XML file 1430, however, is set to "Tool", to indicate that the computer has been successfully configured for connection to the router, and administrative tool component 440 has been installed as part of network application 420 on the computer. Thus, when network application 420 is launched on the computer, it knows to execute administrative tool component 440 to provide users with the ability to configure administrative settings of the router and network or to add new computers or other devices to the network.

Figure 15:
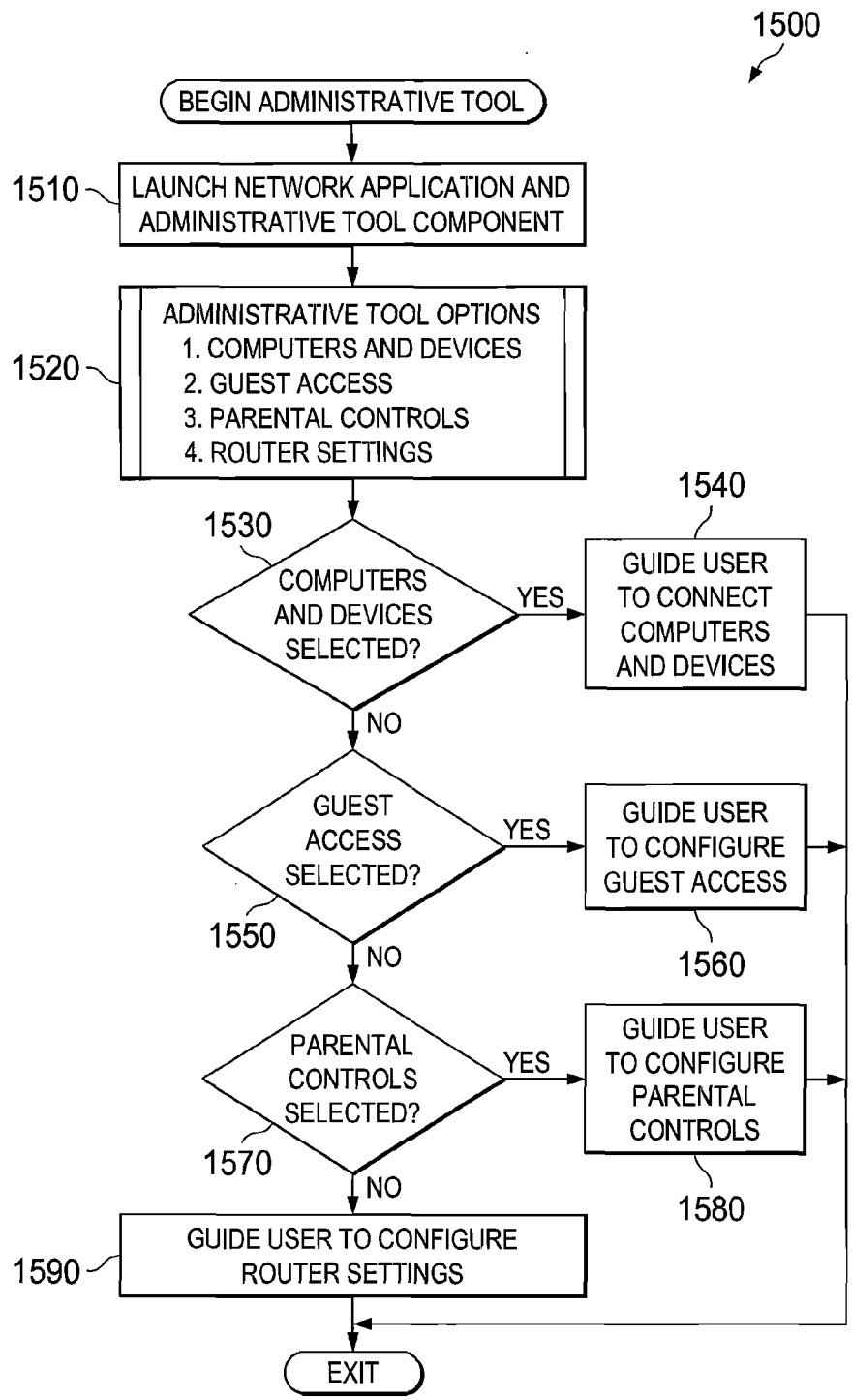
FIG. 15 is a high level flowchart illustrating a series of example steps of an administrative tool flow associated with the system and method for simplifying secure network setup in accordance with embodiments of the disclosure.

Turning now to FIG. 15, FIG. 15 is a high-level flowchart that shows the visual flow 1500 of administrative tool component 440 once it has been installed as part of network application 420 on a computer. In one embodiment, network application 420 is launched by a user as shown in step 1510. This may be accomplished by clicking on a corresponding icon or by selecting a file folder with a corresponding executable file and clicking on the executable file. When the user clicks on the corresponding icon or executable file, network application 420 is launched on the computer and may read configuration settings file 410, which has also been stored on the computer. If the mode element of the configuration settings file is set to "Tool" then administrative tool component 440 of network application 420 begins.

In one example embodiment, administrative tool component 440 gains administrative access on the router through a browser administration webpage. Typically, technology such as Basic Authentication requires an administrative username and password in order to gain access through the administration webpage so that router configurations and settings may be changed or otherwise modified. In one example embodiment, however, administrative tool component 440 sends a command to the router telling the router to trust access from the computer on which administrative tool component 440 is executing. The automatic access may be given for a specified period of time. This software to webpage transition enables administrative tool component 440 on the computer to change or otherwise modify router configurations and settings as necessary to carry out the selections requested by the user (e.g., connect computers or other devices, guest access, parental controls, router settings) without having to receive the administrative username or password from the user.

Figure 16:
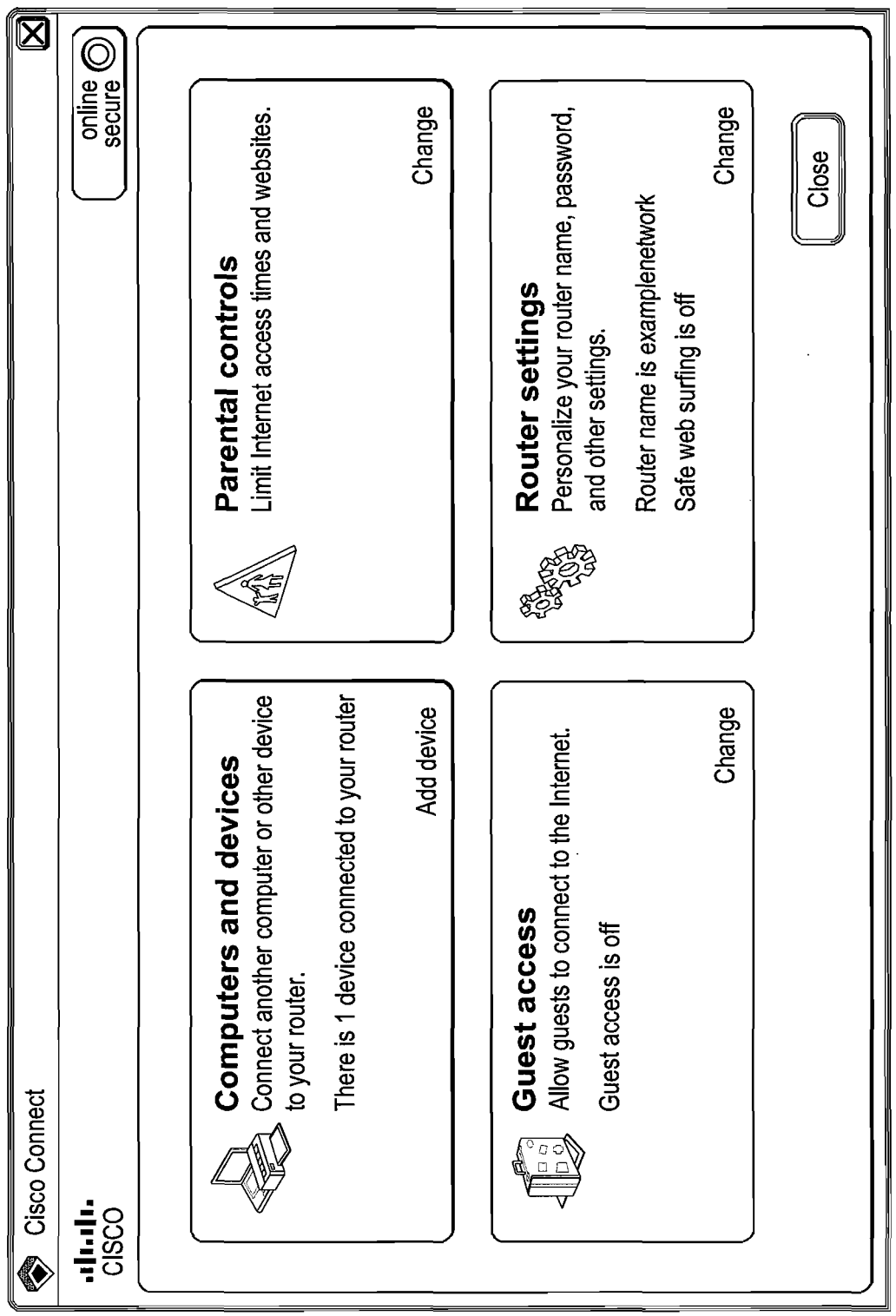
FIG. 16 shows an example administrative tool options screen display in accordance with embodiments of the disclosure.

In step 1520, a screen is displayed with administrative tool options for a user to select, such as the screen shown in FIG. 16. The user may select a "Computers and Devices" option as indicated in step 1530, and the user may be guided to connect additional computers and devices to the router as indicated in step 1540. The user may select a "Guest access" option as indicated in step 1550, and the user may be guided to configure a guest access network to the router as indicated in step 1560. The user may select a "Parental controls" option as indicated in step 1570 and the user may be guided to configure parental controls as indicated in step 1580. The user may select a "Router settings" option and the user may be guided to configure router settings as indicated in step 1590. In one embodiment, after any option is selected and completed, the flow may loop back to step 1520 to display the screen as shown in FIG. 16 until the user opts to close or exit administrative tool component 440. In one embodiment, administrative tool component 440 will monitor the state of the network and help repair it upon noticing a problem (e.g., lost Internet connection, disrupted local wireless or wired network connection, router down, etc.).

Figure 17:
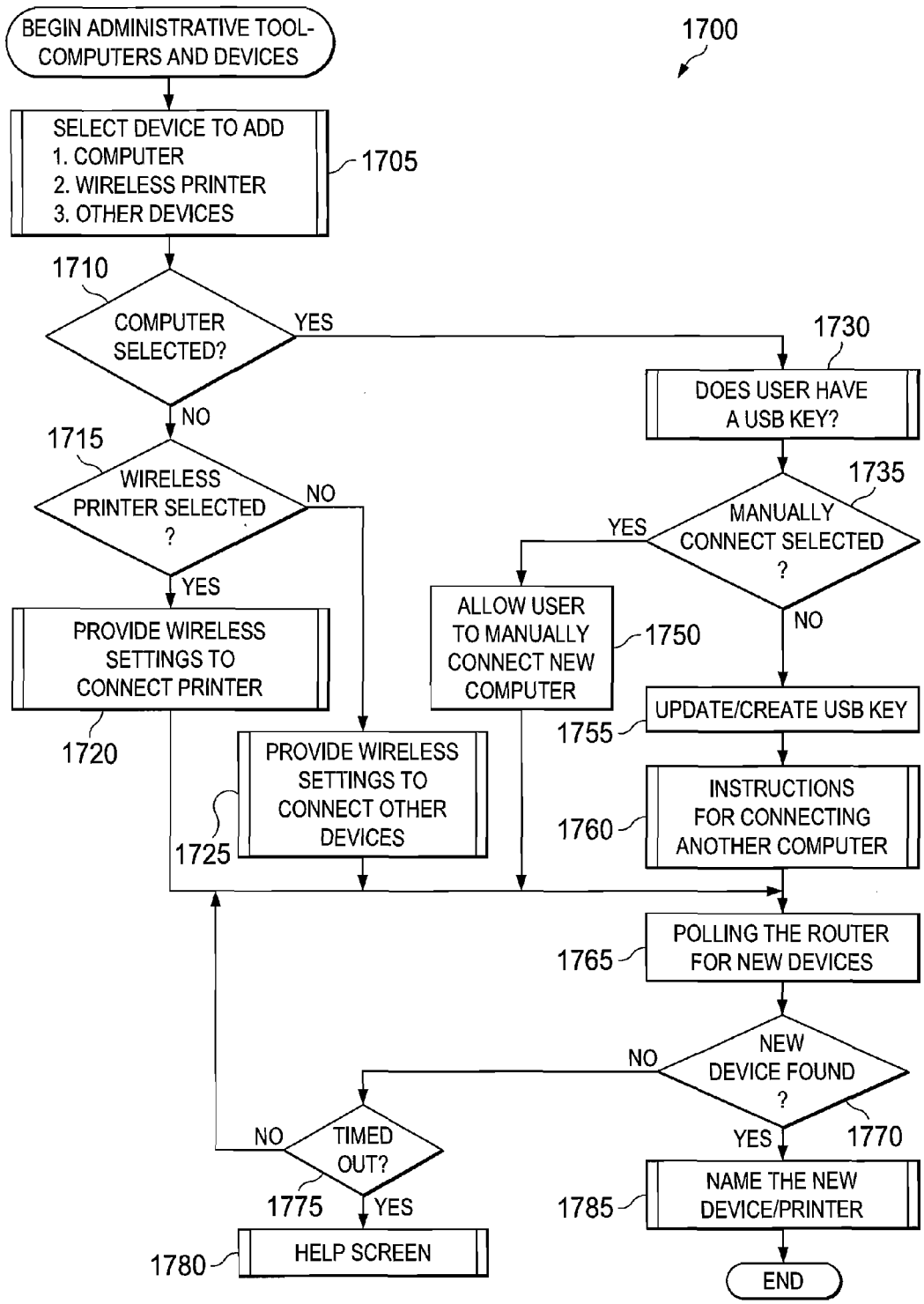
FIG. 17 is a flowchart illustrating more detailed steps of the connect computers and devices step of FIG. 15 in accordance with embodiments of the disclosure.
Figure 18:
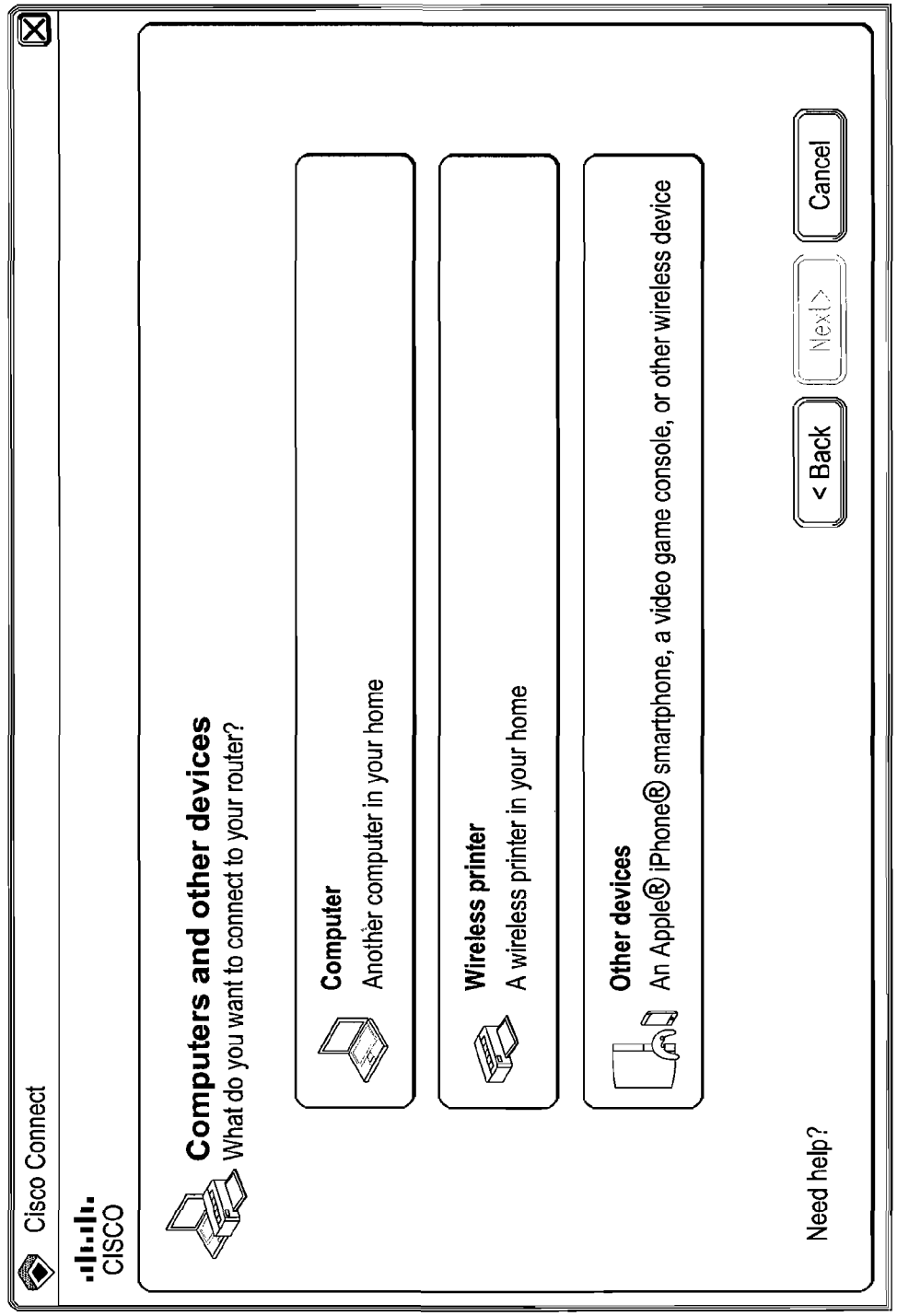
FIG. 18 shows an example connect computers and other devices screen display in accordance with embodiments of the disclosure.
Figure 19:
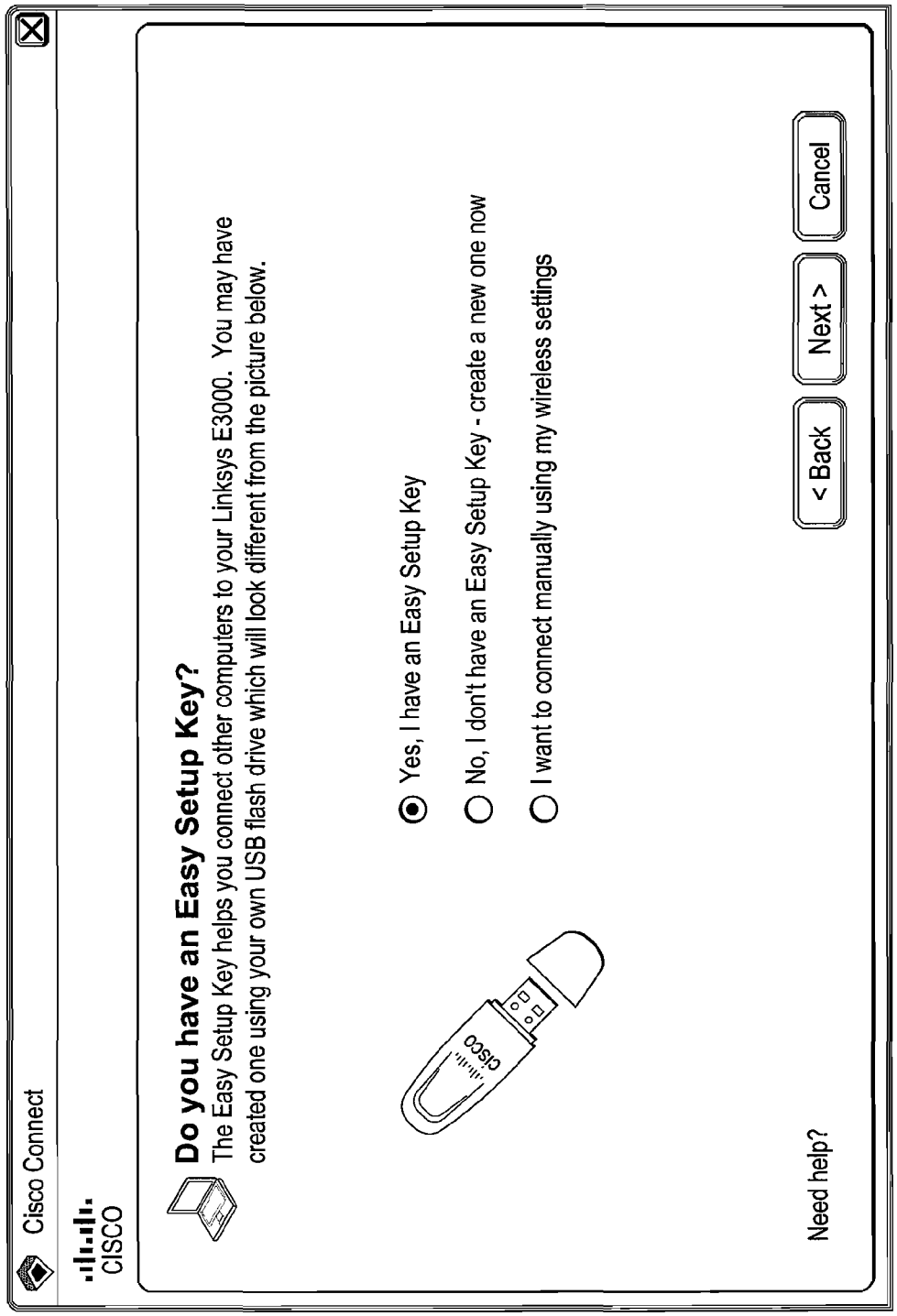
FIG. 19 shows an example easy setup key screen display in accordance with embodiments of the disclosure.
Figure 20:
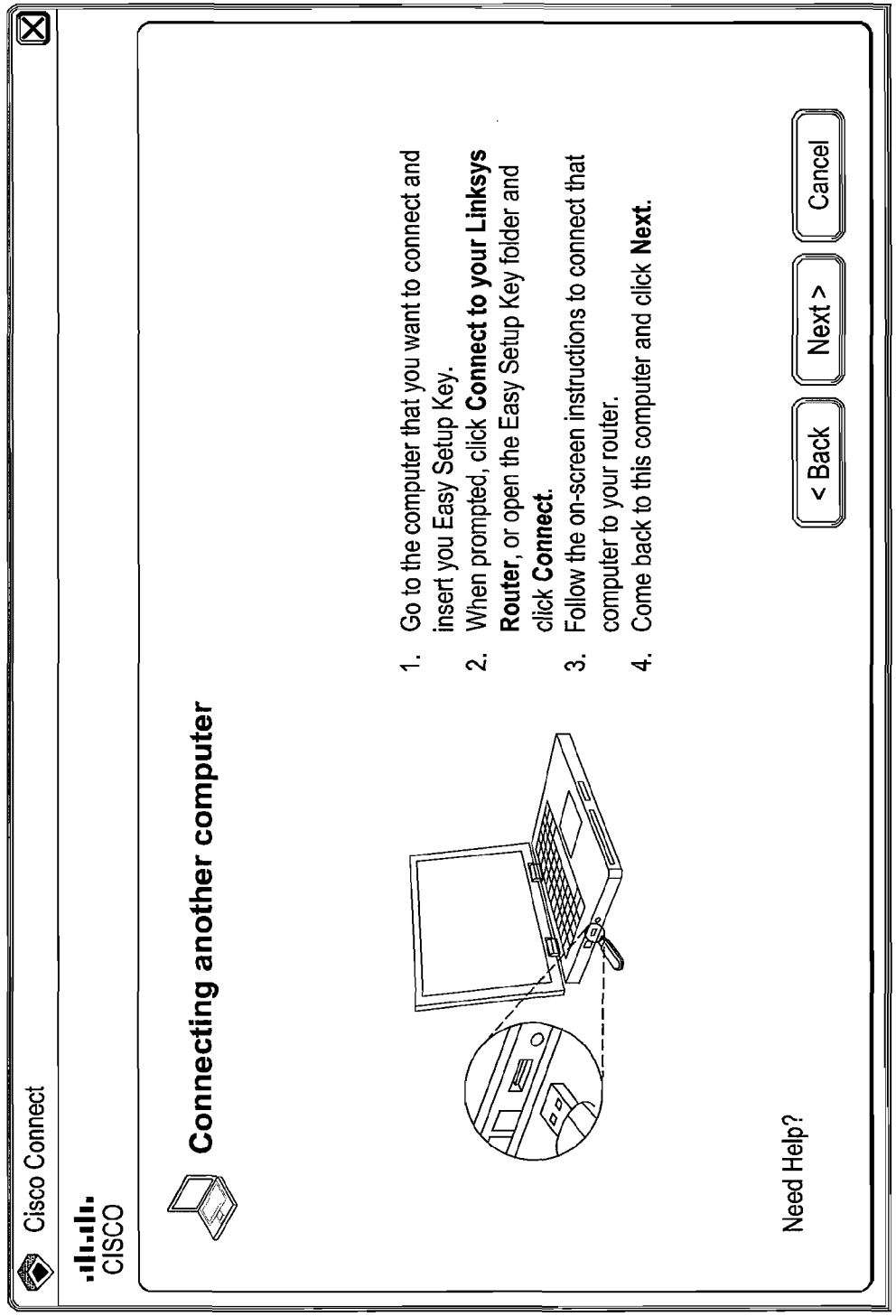
FIG. 20 shows an example connecting another computer screen display in accordance with embodiments of the disclosure.

Referring to FIG. 17, FIG. 17 is a flowchart showing a more detailed process 1700 of step 1540 to guide a user to connect computers and devices. In step 1705, a screen, such as the screen shown in FIG. 18, is displayed with computer and other electronic device options that a user may select to add to the local network and configured router. The user may select a "Computer" option as indicated in step 1710, and flow will pass to step 1730 where a screen will be displayed, such as the screen shown in FIG. 19, asking if the user has an Easy Setup Key. The user may select "yes" to proceed, "no" to create a new USB key, or "I want to connect manually" to connect a computer manually without the use of the USB key. At step 1735, it is determined which option the user selected from the screen in FIG. 19. If the user selected "I want to manually connect" then flow passes to step 1750 where the user may proceed to manually connect a new computer. However, if the user chooses either the "yes" or "no" option in step 1730 (i.e., the manually connect option was not selected), then the user is guided to update/create a new USB key in step 1755. A screen may be displayed with pictures and instructions to insert the existing USB key or a new USB key into a USB port on the computer. Various error messages may be displayed for any USB key problems (e.g., memory full, incompatible format, write protected, etc.). After the USB key has been updated or created flow passes to step 1760 where a screen may be displayed, such as the screen shown in FIG. 20, with instructions for the user to add another computer to the network. The instructions include inserting the newly updated or created USB key into the new computer, launching a connect component from the USB key, following the instructions provided by the connect component, and returning to the first computer and clicking the NEXT user interface control button on the current screen, shown in FIG. 20 and displayed on the first computer.

Figure 21:
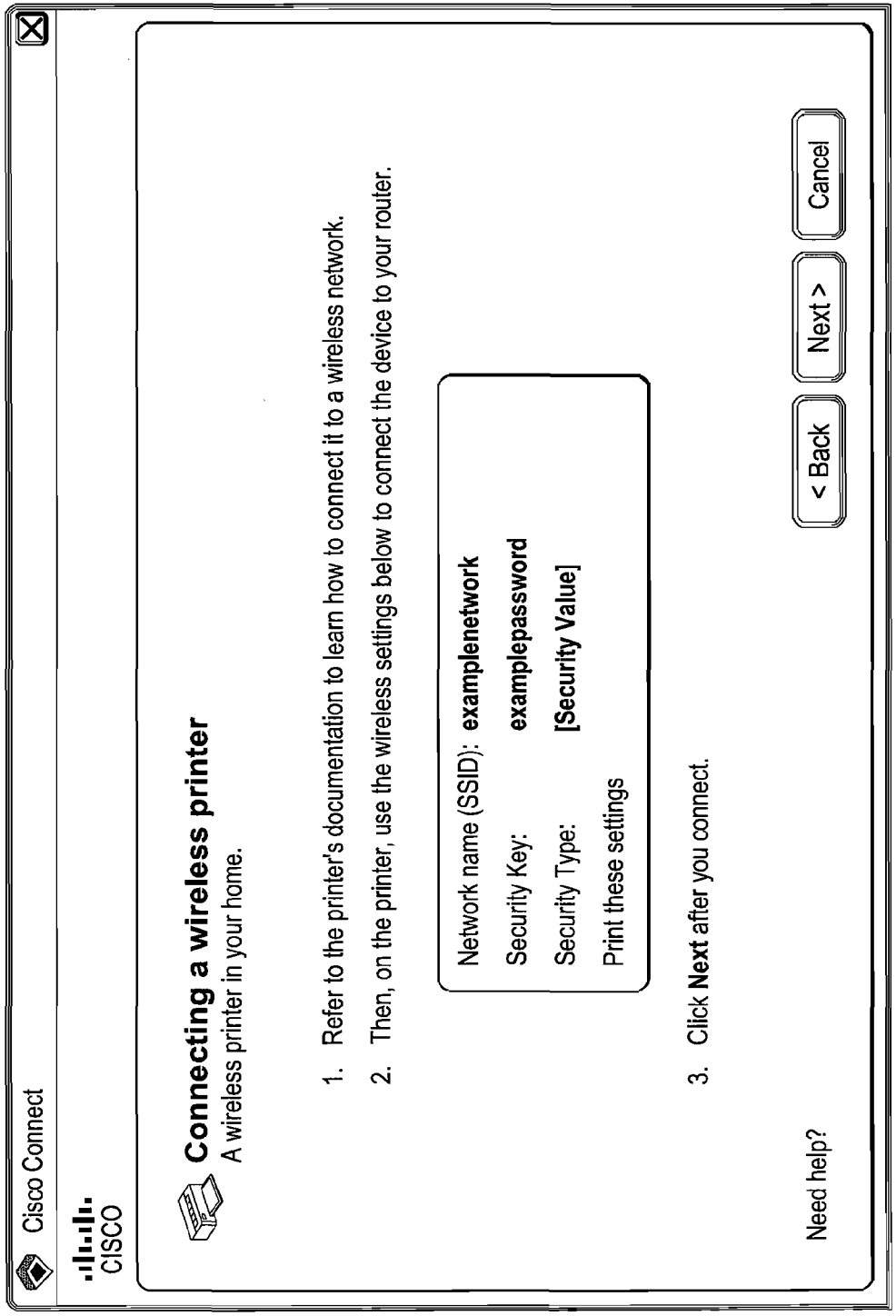
FIG. 21 shows an example connecting a wireless printer screen display in accordance with embodiments of the disclosure.
Figure 22:
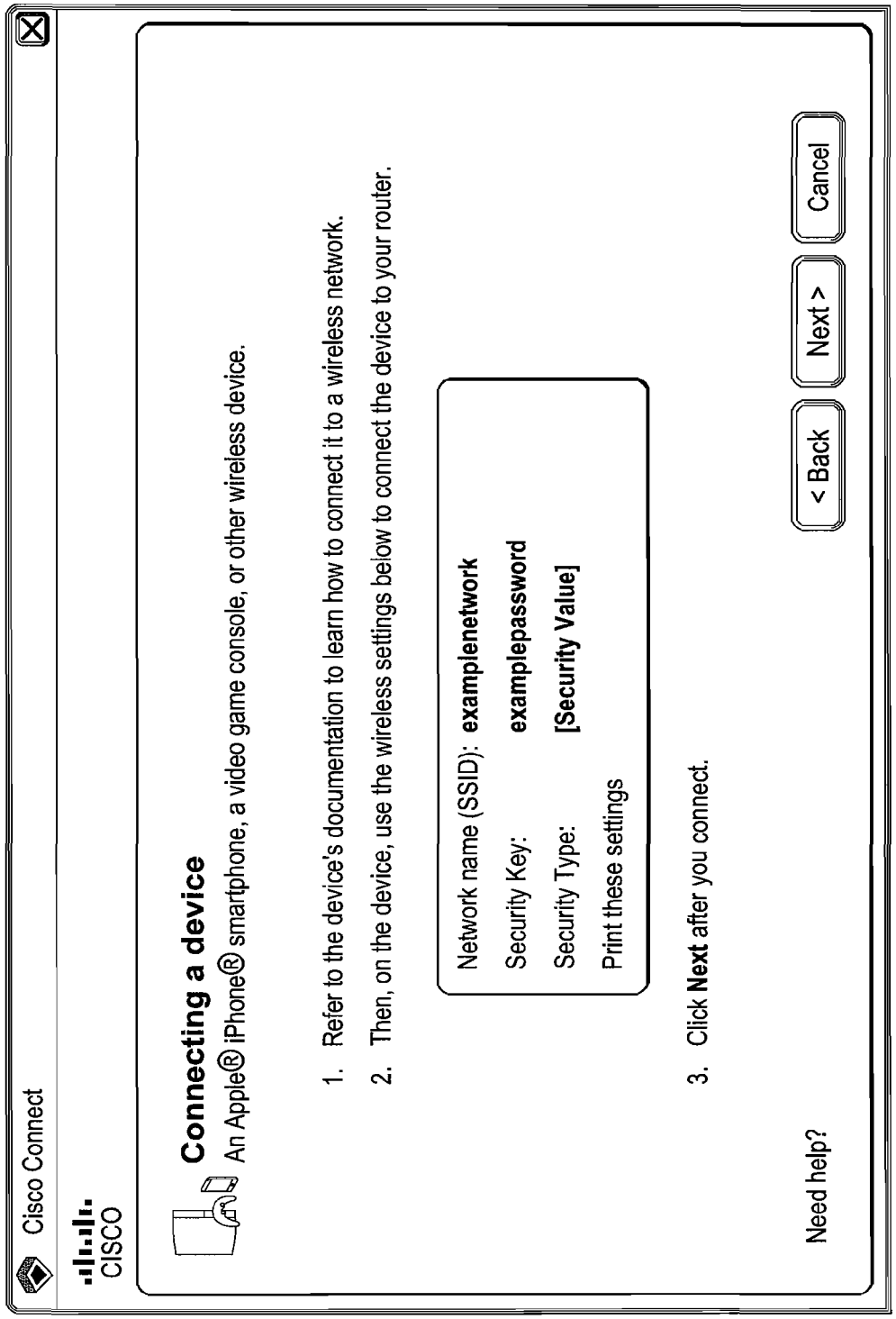
FIG. 22 shows an example connecting a device screen display in accordance with embodiments of the disclosure.

With reference again to step 1710 in FIG. 17, if the user does not select "Computer" then flow passes to step 1715 to determine whether the user selected "Wireless printer." If the user selected "Wireless printer" to add to the network, then flow passes to step 1720 where a screen may be displayed to the user, such as the screen shown in FIG. 21, which provides router network and security settings needed to add a wireless printer to the network (i.e., network name (SSID), security key, and security type). The screen instructs the user to print the settings and use them to set up the wireless printer in accordance with the printer's documentation. The screen instructs the user to click the NEXT user interface control button on the current screen, shown in FIG. 21 and displayed on the first computer, after the user has successfully connected the wireless printer to the network.

With reference again to step 1715 in FIG. 17, if the user does not select "Wireless printer" then the user has selected "Other Devices" to add to the network and flow passes to step 1725. In step 1725, a screen may be displayed to the user, such as the screen shown in FIG. 22, which provides router network and security settings needed to add a another device to the network (i.e., network name (SSID), security key, and security type). The screen instructs the user to print the settings and use them to set up the other device (e.g., a smartphone, a video game console, or other wireless device) in accordance with the device's documentation explaining how to connect the device to a wireless network. The screen instructs the user to click the NEXT user interface control button on the current screen, shown in FIG. 22 and displayed on the first computer, after the user has successfully connected the wireless device to the network.

After the user has successfully connected a computer, a wireless printer or other wireless device and the user has clicked the NEXT user interface control button on the associated screen displayed on the first computer, flow passes to step 1765 where the operating system of the first computer polls the router for any new computers or other devices the router detects. In one embodiment, the router provides the network names of any detected computers and other devices to administrative tool component 440. The detected computers and other devices are then compared to a file stored in the first computer containing identifiers of configured network computers and other devices, to determine whether the router has detected anything new. If a new computer or device has been detected, the new identifier is added to the file in the first computer and the router also stores information about the new computer or device. If a new device is not found in step 1770, then a time out procedure is used in steps 1775 and 1780. In step 1775, a determination is made as to whether polling has reached a maximum time limit, and if it has not, flow loops back to step 1765 to continue polling to detect a new device in the network. However, if a maximum time limit has been reached in step 1775, then a display screen offering assistance to the user may be displayed in step 1780.

Figure 23:
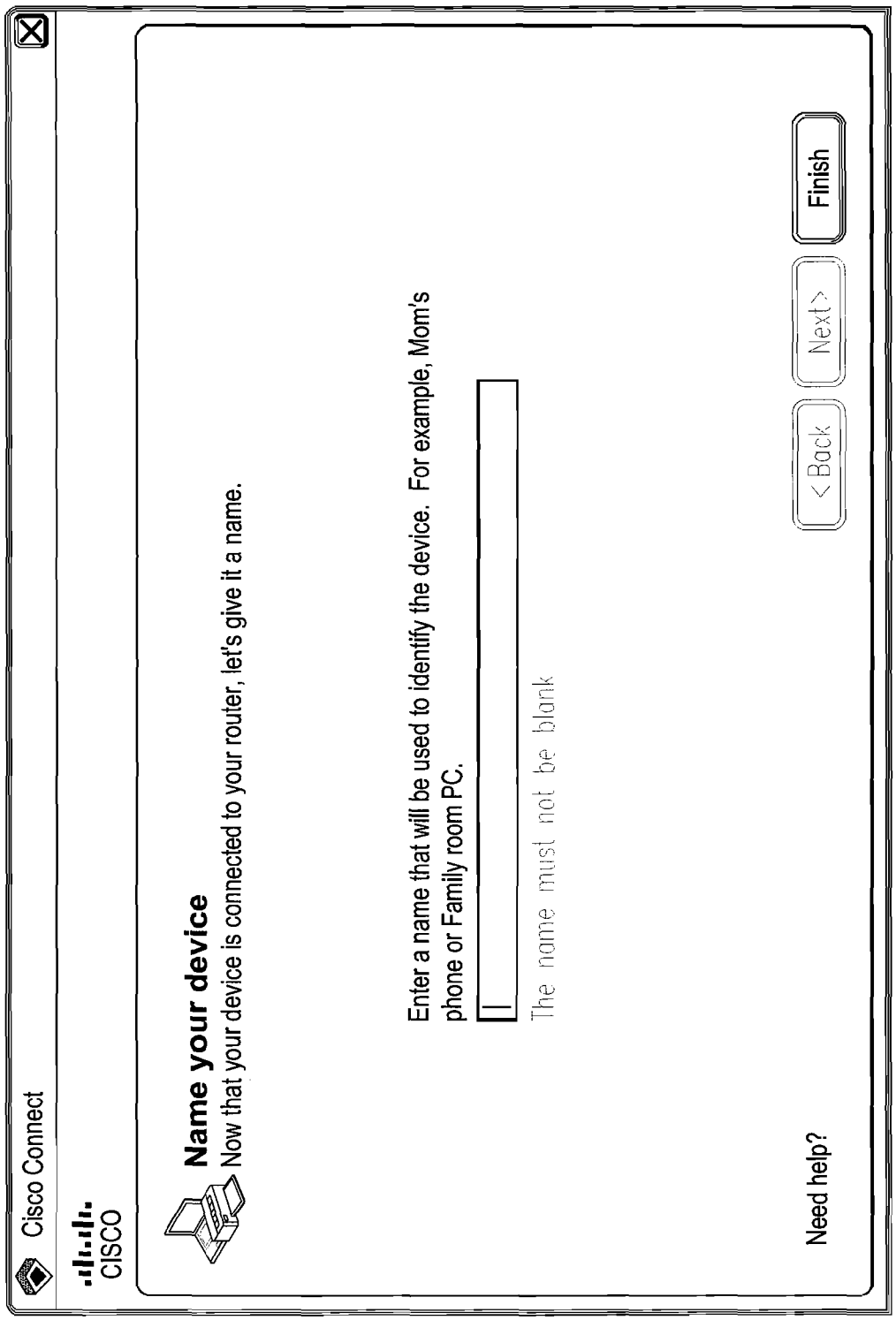
FIG. 23 shows an example name your device screen display in accordance with embodiments of the disclosure.

Once a new computer or device has been found on the network, and necessary information has been stored in the first computer and the router, a screen may be displayed on the first computer, such as the screen shown in FIG. 23, allowing the user to name the new computer, wireless printer, or other wireless device. The name is stored in the first computer to allow the user to easily recognize the particular computer or other device. The name may also be used to assist the user when configuring administrative settings such as, for example, parental controls.

In another example embodiment, any of the networked devices may be given simple human readable names (e.g., "Joe's Phone", etc.) by opening a browser on the particular device to be named. A simple word or phrase, (e.g., "IdentifyMe", etc.) may be available for the router to capture a new name for the particular device. In this example, once a user types "IdentifyMe", an HTML page may be sent to the device for the user to enter the new human readable name for the device. The router then matches the human readable name to the device so that the user can subsequently recognize the device when accessing the device through the network.

Figure 24:
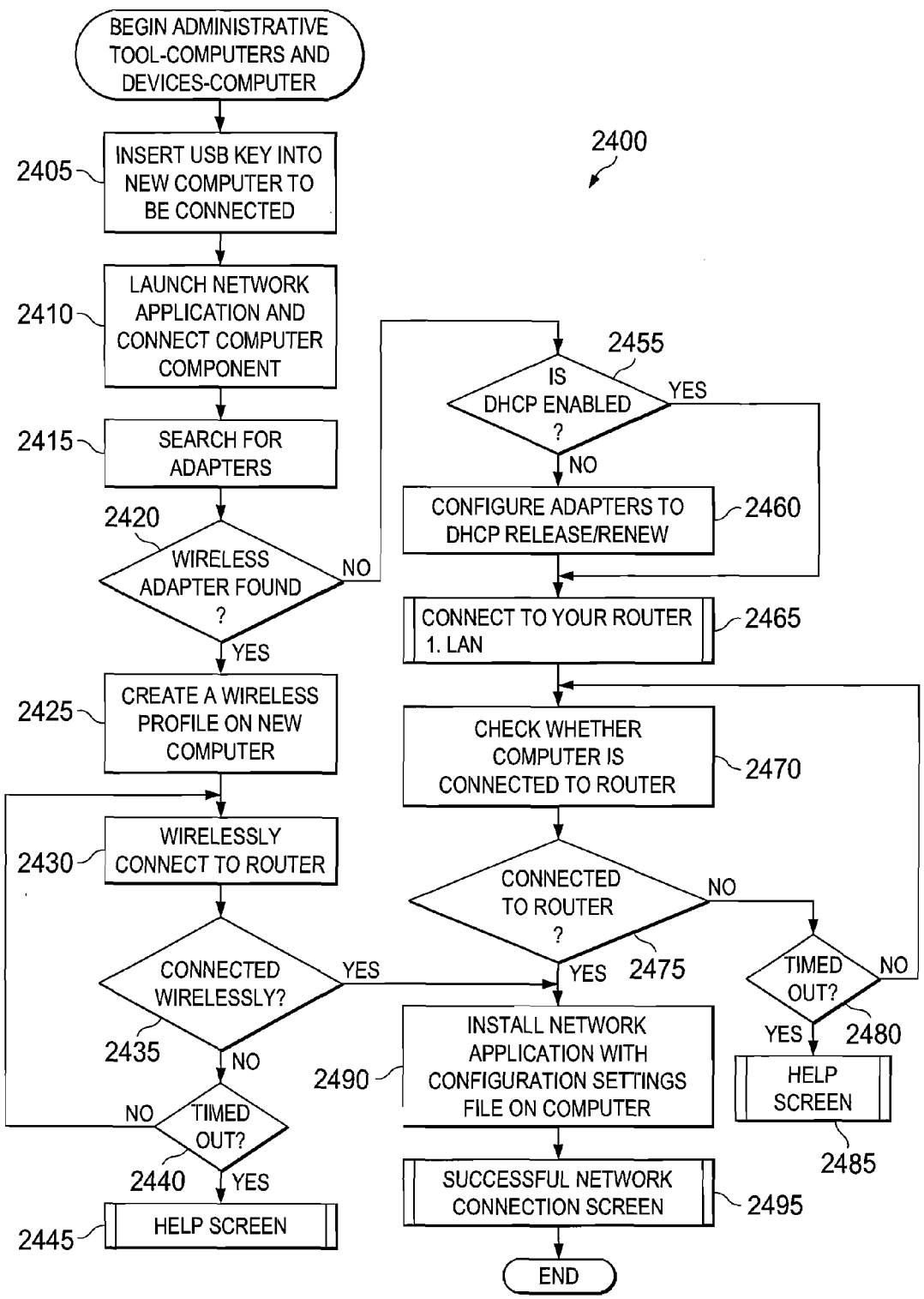
FIG. 24 is a flowchart illustrating a flow for connecting another computer as instructed in exemplary screen display of FIG. 20 in accordance with embodiments of the disclosure.

Referring now to FIG. 24, FIG. 24 is a flowchart illustrating a process 2400 for adding a new computer to a network previously configured using a system and method in accordance with the present disclosure. In one embodiment as shown in FIG. 24, a computer readable medium such as a USB key, which may have been updated or created as shown and described with reference to step 1755 of FIG. 17, is used to connect the new computer. At step 2405, the user inserts the USB key into the new computer to be connected to the network. At step 2410, network application 420 is launched from the USB key as previously described herein. If the mode element of configuration settings file 410 on the USB key is "Connect" and the setup indicator is set to "true", the state of the USB key will be recognized as ready to configure a new computer for connection to the network using the settings encoded in configuration settings file 410 on the USB key. Accordingly, network application 420 initiates connect computer component 450.

In step 2415, an operating system on the new computer may be used to search for available network adapters on the new computer. This search may be accomplished using operating system application programming interfaces (APIs). In step 2420, a determination is made as to whether a wireless network adapter has been found. In one embodiment, connect computer component 450 may default to configuring a wireless connection even if the new computer includes both wired and wireless adapters. In addition, although not specifically shown in FIG. 24, if no adapters are found on the new computer, then connect computer component 450 will provide appropriate help and/or error message screen displays to the user, and no configuration steps will be taken until an adapter is found.

In one embodiment, logic shown and described with reference to FIG. 6A may be performed in the flow of FIG. 24. At step 2420, once a wireless adapter is found, a determination may be made with respect to whether the wireless adapter is enabled, and if necessary, it may be automatically enabled. The determination and enablement may be accomplished using operating system APIs, which may occur in the background without any user interaction. In one embodiment, the software determines which adapter is the fastest and then enables that adapter.

Not shown in FIG. 24, is logic to reconfigure a router if it has been reset or otherwise lost its configuration settings. The new computer may begin polling to find a router using the SSID stored on the USB key or other computer readable medium. If a router with the SSID is not found, then the computer may begin polling to find any networking device within a wireless connectivity range. Once a networking device, such as a router, is found, a determination may be made as to whether an SSID of the found router has a predetermined format (e.g., CISCOXXXXX). If the SSID has the predetermined format, then at least a portion of the identifier (e.g., XXXXX) may be compared to at least a portion of a serial number stored in the configuration settings file 410 on the USB key or other computer readable medium. If the serial numbers match, then appropriate steps of setup component 430, as shown and described with reference to FIGS. 6A and 6B, may be initiated to reconfigure the router.

In step 2425, a wireless profile may be created in the new computer. The wireless profile may be created using existing configuration settings from configuration settings file 410 on the USB key. Configuration settings file 410 may contain configuration settings, such as those shown in example XML file 1420, which was shown and described with reference to FIG. 14. The wireless profile may include, among other things, the SSID and the network password, which can be used by the operating system to establish a secure, persistent wireless connection with the router.

With reference to step 2430 of FIG. 24, after the wireless profile is created on the new computer, the SSID stored in the profile may be used to begin polling to find the associated router in step 2430. In one embodiment, the polling may include using the operating system wireless APIs for detecting the SSID. If a wireless connection is not made in step 2435 (e.g., the SSID is not found), then a time out procedure is used in steps 2440 and 2445. In step 2440, a determination is made as to whether polling has reached a maximum time limit, and if it has not, flow loops back to step 2430 to continue polling to find the router. However, if a maximum time limit has been reached in step 2440, then a display screen offering assistance to the user may be displayed in step 2445. If the router is found and a wireless connection is made in step 2435, then flow passes to step 2490, where network application 420 and configuration settings file 410 may be installed on the new computer from the USB key inserted in or otherwise in communication with the new computer. This installation enables a user to launch administrative tool component 440, which is part of network application 420, on the new computer. In another embodiment, network application 420 or a separate administrative tool component may be downloaded from a web server and installed on the new computer if the installation occurs after the connection between the new computer and the router has been successfully completed and the new computer has access to the Internet. After network application 420 and configuration settings file 410 have been installed in the new computer, a successful network connection screen may be displayed to the user on the new computer as shown in step 2495.

With reference again to step 2420 in FIG. 24, if a wireless adapter is not found, then connect computer component 450 may configure a wired network through a wired network adapter, such as an Ethernet adapter, on the new computer. The wired connection process may begin by determining in step 2455 whether the wired network adapter is enabled with Dynamic Host Configuration Protocol (DHCP). If the wired network adapter is not DHCP enabled, then in step 2460, the wired network adapter settings are configured to DHCP release/renew. In step 2465, a screen such as the screen in FIG. 10 may be displayed to the user with options for additional directions and pictorials on how to connect the new computer to the router.

Once the user finishes manually connecting the new computer to the router with a network cable, the user may click the NEXT user interface control button. As shown in step 2470 in FIG. 24, a check is performed to determine whether the computer has a network connection to the expected router, identified in the configuration settings file 410 on the USB key. If a network connection to the expected router is detected in step 2475, then flow passes to step 2490, and processing continues as previously described herein. However, if it is determined that the new computer is not connected to the expected router in step 2475, then a time out procedure is used in steps 2480 and 2485. In step 2480, a determination is made as to whether waiting for a connection to the expected router has reached a maximum time limit, and if it has not, flow loops back to step 2470 to continue checking whether connection has been made to the expected router. However, if a maximum time limit has been reached in step 2480, then a display screen offering assistance to the user may be displayed in step 2485.

Figure 25:
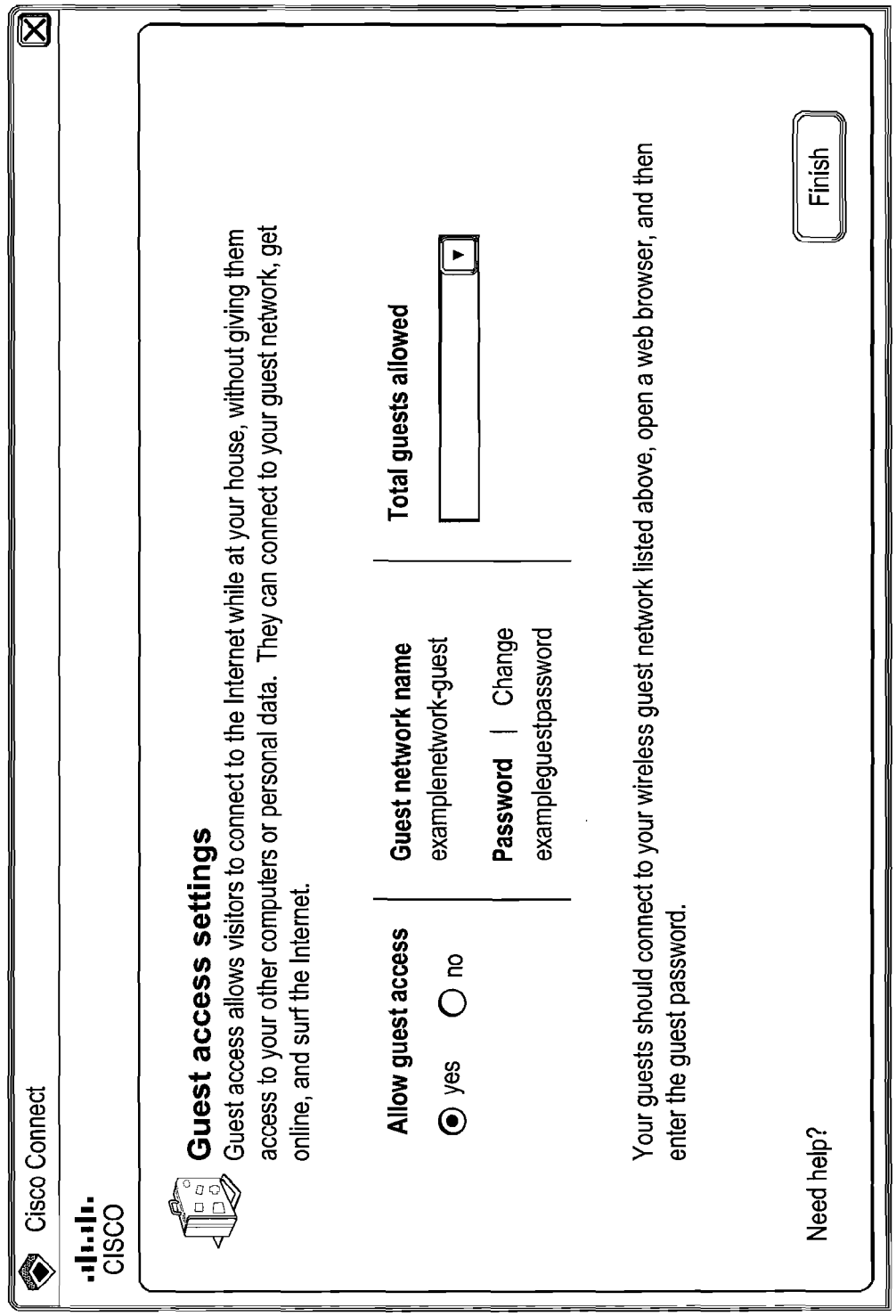
FIG. 25 shows an example guest access settings screen display in accordance with embodiments of the disclosure.
Figure 26:
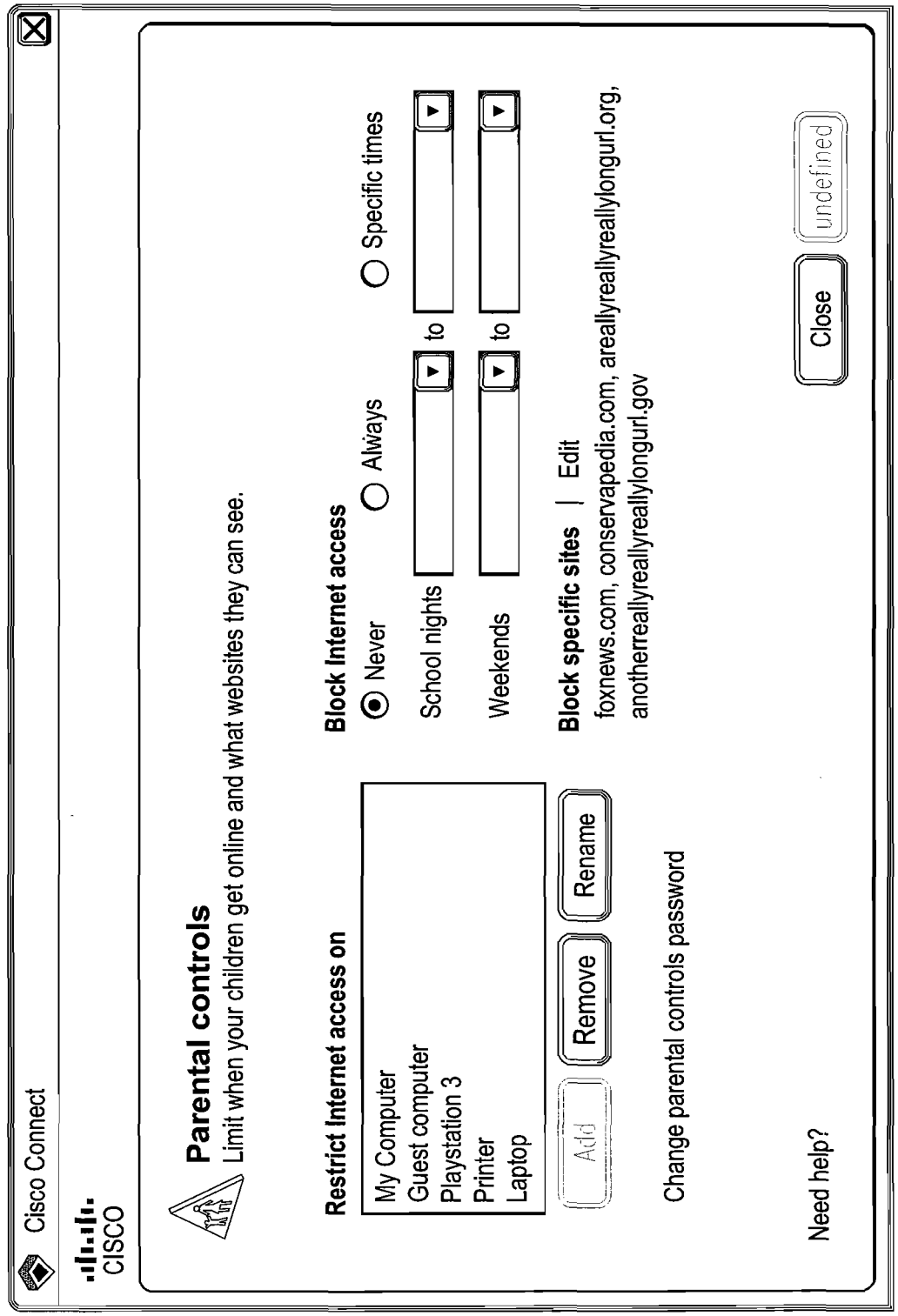
FIG. 26 shows an example parental controls screen display in accordance with embodiments of the disclosure.
Figure 27:
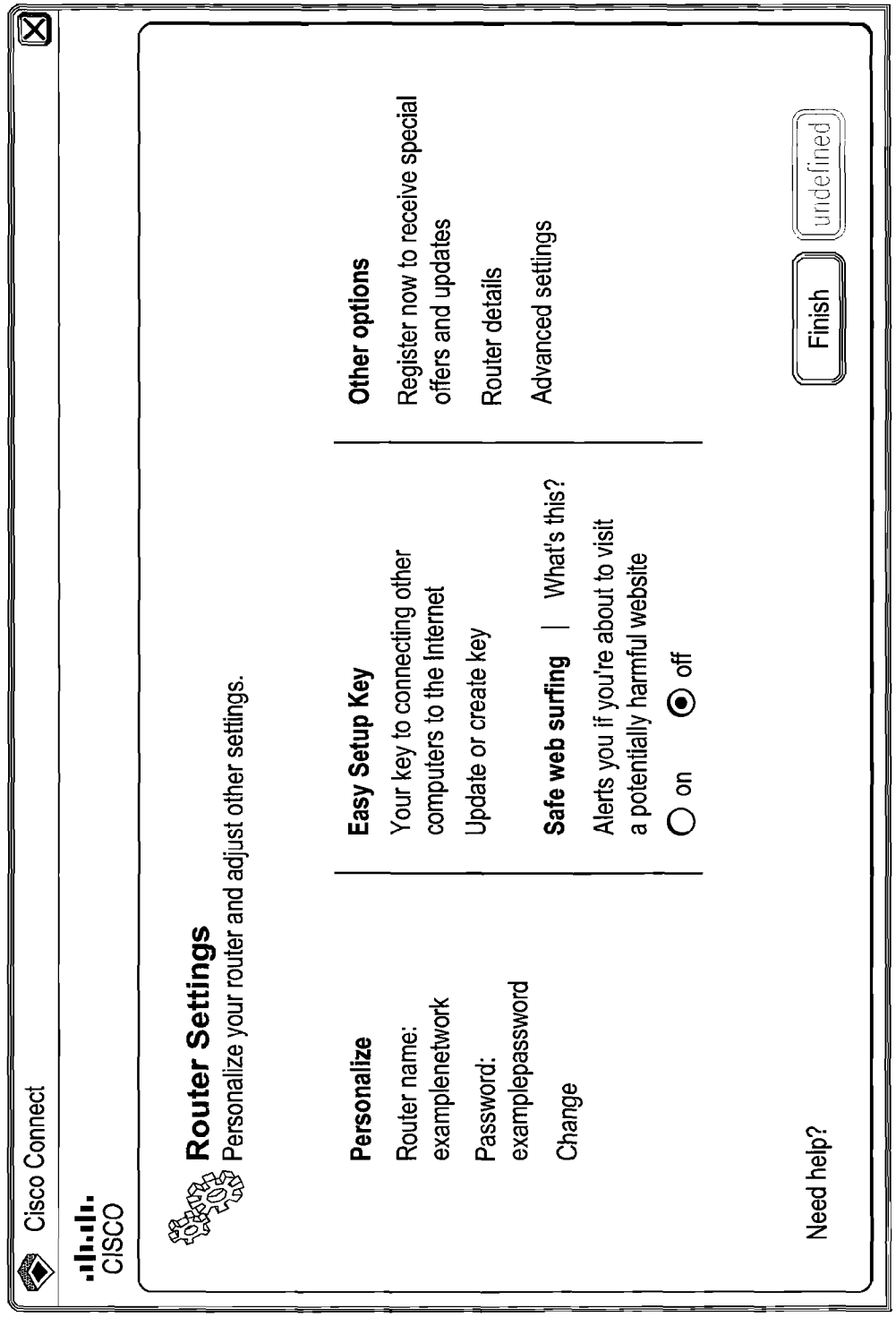
FIG. 27 shows an example router settings screen display in accordance with embodiments of the disclosure.

FIGS. 25, 26, and 27 show example display screens that may be displayed when executing administrative tool component 440 on a computer configured in accordance with the system and method of the present disclosure. FIG. 25 illustrates an example display screen to permit a user with authorization privileges (e.g., owner, primary user, administrator, etc.) of a host network to modify settings of a guest network that was enabled on the host network during setup and configuration. In one embodiment, guest access screen shown in FIG. 25 allows the authorized user to permit or deny guest access, to change a preselected password, and to define a maximum number of guests allowed on the guest network. The authorized user may give any person access to the guest network by providing that person with the guest password. Thus, in this embodiment, a guest is typically someone known to the authorized user who has requested guest access, or to whom the authorized user has offered guest access. Although the authorized user may make configuration changes as desired to the guest network, it may be used without any configuration changes once the host network setup is successfully completed, as shown in FIG. 11B.

In another embodiment for guest networks, an option may be available for the authorized user to configure the guest network as a pay-per-use guest access model and/or as an ad-supported guest access model. For example, a guest network may be made available to any outside users, known or unknown to the authorized user of the host network, within a wireless connectivity range of the router. In one implementation, the outside user would be able to view the guest network in a list of available wireless networks whenever the outside user was within a wireless range of the router. Upon selecting the guest network, the outside user could be prompted to send a request seeking authorization to access the guest network. The authorization request could be sent to an authorized user of the host network. If the authorized user approves the outside user to access the guest network, then the outside user could be provided with the guest access password.

In a pay-per-use guest access model, the outside user could be charged a fee for usage. In one embodiment, the owner of the host network could have a dedicated account for receiving payments directly from such outside users. In another embodiment, an intermediary billing and payment provider (e.g., Paypal, etc.) could be used to process financial transactions between the owner of the host network and outside users. In an ad-supported guest access model, rather than receiving individual payments for access to the guest network, advertisements could be used in guest networks. For example, the login screen for the guest access network could contain various forms of advertisements. Thus, outside users could use the guest network without charge, but would become a captive audience for some advertisements during at least a portion of time spent accessing the guest network. In one embodiment, the owner of the host network, or any other authorized person, could sell such advertisements and receive payment directly from the advertisers. Alternatively, an Internet Service Provider (ISP) connected to the router could sell the advertisements. In this embodiment, payment to the owner of the host network could be arranged in any number of mutually acceptable ways, including, for example, as a deduction on a monthly bill from the ISP.

Turning now to FIG. 26, FIG. 26 illustrates an example display screen for an authorized user of a network, such as network 100, to configure and customize parental controls for any computers and other devices on the network. Parental controls screen shown in FIG. 26 allows the authorized user to customize Internet access for each of the named computers or other devices on the network. For each named computer or other device on the network, the authorized user may configure unlimited Internet access, total Internet restriction, or specified days and times of Internet restriction. In addition, the authorized user may also block specific web sites. Although the screen in FIG. 26 allows the authorized user to configure specific parental controls, including specified time and content restrictions, in one embodiment previously described herein, the parental controls are enabled to prevent security threats (e.g., malware) as soon as the network setup has been successfully completed. This initial configuration with security threat protection may be accomplished without any configuration settings or other substantive information required from a user setting up the network.

Turning to FIG. 27, FIG. 27 illustrates an example display screen for an authorized user to configure and customize router settings for a router on a network, such as network 100. Router settings screen in FIG. 27 allows the authorized user to customize and change a network SSID and a network password, to update or create a USB key with current configuration settings, to configure alerts for potentially harmful websites before accessing such web sites, and to access other options that may typically be selected by users with some knowledge of router configuration. For example, one option available from the screen in FIG. 27 is "Advanced Settings." This option allows the user to manually make changes to the router from the existing administration webpage. In one embodiment, when "Advanced Settings" is selected, the user is not required to provide an administrative username and password because, as previously described herein, administrative tool component 440 gains access from the computer to the router through the browser administration webpage for a specified period of time after administrative tool component 440 is launched. Thus, the authorized user may manually customize router settings after the network has been successfully setup by simply launching the administrative tool component 440 on the computer and selecting "Advanced Settings," without needing to provide router access information such as the administrative username and password.

In accordance with the present disclosure, embodiments of the system may include other screens to assist the setup and configuration of a network. For example, help screens may include instructions for the user to try to remedy the particular problem (e.g., wireless connection problem, Internet connection problem, etc.). Other help screens may suggest the user contact customer support and/or technical support and may provide, for example, a phone number, a web address, or other method to contact the particular support team. During some processing, a wait screen may be displayed to indicate that the system is currently processing. Screens may also be displayed when a particular connection that was previously established has been lost. Finally, various screens navigating the user through administrative options such as parental controls, guest access, and router settings may also be displayed when needed.

In an alternative embodiment of the system and method for simplifying secure network setup, computer readable medium 400 may be configured to directly access router 300 to provision a wireless network, such as network 100 shown in FIG. 1. For example, computer readable medium 400, in the form of a USB key, may be plugged into router 300 such that router 300 provisions the USB key with certain configuration settings (e.g., network identifier, network password, administrative password). Thus, in this embodiment, configuration settings are provided by router 300 rather than a first computer used to provision a network with router 300. In such a case, after router 300 stores configuration settings on the USB key, the USB key may then be used to configure a wireless connection between router 300 and any suitable wireless devices to be added to the network. In addition, the USB key may also contain administrative tool component 440, which could be executed on a computer connected to router 300, to assist a user in adding to the network other wireless and wired devices not adapted to receive USB input.

In certain example implementations, the simplifying secure network setup activities outlined herein may be implemented in software, which can be provided at various locations. In one example implementation, this software, or portions thereof, is resident in one or more memory elements provided in a computer readable medium, a computer sought to be configured for connection to a network, and a router. In other examples, the software of the system for simplifying secure network setup activities could involve a proprietary element (e.g., as part of a network configuration and security solution), which could be provided in (or be proximate to) these identified elements, or be provided in any other device, network adapter, server, network appliance, console, firewall, switch, information technology (IT) device, distributed server, etc., or be provided as a complementary solution (e.g., in conjunction with parental controls), or provisioned somewhere in the network. For example, in the various embodiments described herein, the software may be provisioned in a memory element of a wireless network adapter provided to a computer to enable wireless connection to a router as described herein. In such embodiments, the wireless adapter may be configured to be plugged into a computer to provision a wireless network with the router or, in an alternative embodiment, may be configured to directly access the router to receive configuration settings prior to being plugged into the computer to provision the wireless network. In other embodiments, the software features may be provided externally to these elements, included in other devices to achieve these intended functionalities, or consolidated in any appropriate manner. For example, certain applications, components, or modules of the software could be separated and provided via another element such as a web server (e.g., application tool component 430). In a general sense, the arrangement depicted in FIG. 1 may be more logical in its representation, whereas a physical architecture for providing the system and method for simplifying secure network setup may include various other permutations/combinations/hybrids of these elements.

In some embodiments, these elements (e.g., computers 120, other electronic devices 110, router 130, computer readable medium 140, etc.) may include software (or reciprocating software) that can coordinate, manage, or otherwise cooperate in order to achieve the simplifying secure network setup operations, as outlined herein. One or all of these elements may also include any suitable algorithms, hardware, software, components, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, one or more memory elements (as shown in FIGS. 2-4) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processors (as shown in FIGS. 2-3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of these elements (e.g., computer, computing device, electronic devices, router, etc.) can include memory elements for storing information to be used in achieving the system for simplifying secure network setup activities as outlined herein. Additionally, each of these devices may include a processor that can execute software or an algorithm to perform the secure network setup activities as discussed in this Specification. These devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., computer readable medium 400, computer memory 220, router memory 320, etc.) should be construed as being encompassed within the broad term 'memory element.' Similarly, any of the potential processing elements, modules, and machines described in this Specification should be construed as being encompassed within the broad term 'processor.' Each of the computers, electronic devices, network appliances, routers, modems, servers, etc. may also include suitable wireless or hardwired interfaces for receiving, transmitting, and/or otherwise communicating data or information in a network environment.

Note that with the examples provided herein, interaction may be described in terms of two, three, four, or more network components (e.g., computer readable medium, router, adapters, computers, electronic devices, etc.). However, this has been done for purposes of clarity and example only. It should be appreciated that the system could be consolidated in any suitable manner, which is clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) is readily scalable. The system of FIG. 1 can accommodate a larger number of components, as well as more complicated or sophisticated arrangements and configurations. Accordingly, the examples provided should not limit the scope or inhibit the broad teachings of the system of FIG. 1 as potentially applied to other architectures.

It is also important to note that the operations described with reference to the preceding FIGURES illustrate only some of the possible scenarios that may be executed by, or within, the system and method in accordance with the present disclosure. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is possible in that any suitable arrangements, chronologies, configurations, and timing mechanisms may be provided without departing from the teachings of the discussed concepts.

What is claimed is:

1. A method, comprising:
   discovering, by a first computing device, a networking device with a network identifier, the networking device being within a wireless connectivity range from the first computing device;
   determining whether the networking device is unconfigured based on the network identifier, wherein the network identifier has a predetermined format including at least a portion of a predefined character string assigned to the networking device;
   generating new network configuration settings if the networking device is unconfigured, wherein the new network configuration settings include a new network identifier for the networking device;
   sending the new network configuration settings from the first computing device to the networking device to configure the networking device for wireless connectivity, wherein the new network configuration settings are to be stored in a memory element of the networking device; and configuring the first computing device with one or more of the new network configuration settings to initiate a wireless connection to the networking device, wherein the wireless connection is created without requiring any configuration settings associated with the wireless connection to be provided by a user.

2. The method of claim 1, wherein the configuring the first computing device further includes creating a wireless profile for the first computing device, wherein the wireless profile includes one or more of the new configuration settings.

3. The method of claim 1, wherein the new network configuration settings include a new network password.

4. The method of claim 1, wherein the unconfigured networking device is enabled with wireless security encryption protocols.

5. The method of claim 1, further comprising:
storing one or more of the new network configuration settings in a configuration settings file of a transportable computer readable medium, wherein the computer readable medium is a read-writable medium.

6. The method of claim 5, wherein the configuration settings file includes one or more elements indicating a state of the transportable computer readable medium, wherein a first state indicates the networking device is unconfigured and a second state indicates the networking device is configured.

7. The method of claim 5, further comprising:
providing the transportable computer readable medium to a new computing device; and
establishing a second connection between the new computing device and the networking device using the one or more new network configuration settings stored on the transportable computer readable medium, wherein the second connection is created without requiring any configuration settings associated with the second connection to be provided by the user.

8. The method of claim 1, further comprising:
determining whether the networking device has made an operative connection to a wide area network, wherein packets of data can be exchanged between the networking device and the wide area network.

9. The method of claim 1, wherein the configuring the first computing device further includes:
determining whether a wireless adapter of the first computing device is disabled; and
automatically enabling the wireless adapter if the wireless adapter is disabled.

10. The method of claim 1, further comprising:
launching an administrative component having a plurality of interactive display screens to be displayed on a user interface of the first computing device, wherein the plurality of interactive display screens includes one or more connect computer display screens providing instructions to guide the user to connect a new computing device to the networking device;
detecting the new computing device after a second connection has been established between the new computing device and the networking device;
sending a new name for the new computing device to the networking device; and
storing the new name in the first computing device.

11. The method of claim 10, further comprising:
installing the administrative component in the first computer by a process selected from a group of processes, the group consisting of copying from a computer readable medium and downloading from a web server.

12. The method of claim 10, wherein the plurality of interactive display screens includes one or more connect other devices display screens providing instructions to guide the user to connect another wireless device to the networking device, and
wherein one of the one or more connect other devices display screens provides one or more of the new configuration settings to be used to connect the other wireless device to the networking device.

13. The method of claim 1, wherein the configuring of the networking device further includes:
detecting whether the first computing device includes an enabled wired connection to a second networking device;
determining whether a network address of the networking device is the same as a network address of the second networking device; and
changing the network address of the networking device if the network addresses of the networking device and the second networking device are the same.

14. Logic encoded in one or more tangible media that includes code for execution and when executed by one or more processors is operable to perform operations comprising:
discovering, by a first computing device, a networking device with a network identifier, the networking device being within a wireless connectivity range from the first computing device;
determining whether the networking device is unconfigured based on the network identifier, wherein the network identifier has a predetermined format including at least a portion of a predefined character string assigned to the networking device;
generating new network configuration settings if the networking device is unconfigured, wherein the new network configuration settings include a new network identifier for the networking device;
sending the new network configuration settings from the first computing device to the networking device to configure the networking device for wireless connectivity;
configuring the first computing device with one or more of the new network configuration settings to initiate a wireless connection to the networking device, wherein the wireless connection is created without requiring any configuration settings associated with the wireless connection to be provided by a user.

15. The logic of claim 14, wherein the configuring the first computing device further includes creating a wireless profile for the first computing device, wherein the wireless profile includes one or more of the new configuration settings.

16. The logic of claim 14, wherein the new network configuration settings include a new network password.

17. The logic of claim 14, wherein the unconfigured networking device is enabled with wireless security encryption protocols.

18. The logic of claim 14, the one or more processors being operable to perform operations further comprising:
storing one or more of the new network configuration settings in a configuration settings file of a transportable computer readable medium, wherein the computer readable medium is a read-writable medium.

19. The logic of claim 18, wherein the configuration settings file includes one or more elements indicating a state of the transportable computer readable medium, wherein a first state indicates the networking device is unconfigured and a second state indicates the networking device is configured.

20. The logic of claim 18, the one or more processors being operable to perform operations further comprising:

launching a connect computer component from the transportable computer readable medium on a new computing device; and establishing a second connection between the new computing device and the networking device using the one or more new network configuration settings stored on the transportable computer readable medium, wherein the second connection is created without requiring any configuration settings associated with the second connection to be provided by the user.

21. The logic of claim 14, the one or more processors being operable to perform operations further comprising:

determining whether the networking device has made an operative connection to a wide area network, wherein packets of data can be exchanged between the networking device and the wide area network.

22. The logic of claim 14, wherein the configuring the first computing device further includes:

determining whether a wireless adapter of the first computing device is disabled; and automatically enabling the wireless adapter if the wireless adapter is disabled.

23. The logic of claim 14, the one or more processors being operable to perform operations further comprising:

launching an administrative component having a plurality of interactive display screens to be displayed on a user interface of the first computing device, wherein the plurality of interactive display screens includes one or more connect computer display screens providing instructions to guide the user to connect a new computing device to the networking device;

detecting the new computing device after a second connection has been established between the new computing device and the networking device;

sending a new name for the new computing device to the networking device; and storing the new name in the first computing device.

24. The logic of claim 23, further comprising:

installing the administrative component in the first computer by a process selected from a group of processes, the group consisting of copying from a computer readable medium and downloading from a web server.

25. The logic of claim 23, wherein the plurality of interactive display screens includes one or more connect other devices display screens providing instructions to guide the user to connect another wireless device to the networking device, and wherein one of the one or more connect other devices display screens provides one or more of the new configuration settings to be used to connect the other wireless device to the networking device.

26. The logic of claim 14, wherein the configuring of the networking device further includes:

detecting whether the first computing device includes an enabled wired connection to a second networking device;

determining whether a network address of the networking device is the same as a network address of the second networking device; and changing the network address of the networking device if the network addresses of the networking device and the second networking device are the same.

27. An apparatus, comprising:

a memory element configured to store data;

a configuration settings file stored in the memory element; and a network application element configured to interface with the memory element and the configuration settings file, the network application element being configured to:

discover, by a first computing device, a networking device with a network identifier, the networking device being within a wireless connectivity range from the first computing device;

determine whether the networking device is unconfigured based on the network identifier;

generate new network configuration settings if the networking device is unconfigured, wherein the new network configuration settings include a new network identifier for the networking device;

send the new network configuration settings from the first computing device to the networking device to configure the networking device for wireless connectivity;

configure the first computing device with one or more of the new network configuration settings to initiate a wireless connection to the networking device, wherein the wireless connection is created without requiring any configuration settings associated with the wireless connection to be provided by a user; and store one or more of the new network configuration settings in the configuration settings file in the memory element, wherein the memory element is a transportable computer readable medium and wherein the computer readable medium is a read-writable medium, wherein the configuration settings file includes one or more elements indicating a state of the transportable computer readable medium, wherein a first state indicates the networking device is unconfigured and a second state indicates the networking device is configured.

28. The apparatus of claim 27, wherein the network application element is further configured to:

create a wireless profile for the first computing device, wherein the wireless profile includes one or more of the new network configuration settings.

29. The apparatus of claim 27, wherein the new network configuration settings include a new network password.

30. The apparatus of claim 27, wherein the network identifier has a predetermined format.

31. The apparatus of claim 30, wherein the predetermined format of the network identifier includes at least a portion of a predefined character string assigned to the networking device.

32. The apparatus of claim 27, wherein the unconfigured networking device is enabled with wireless security encryption protocols.

33. The apparatus of claim 27, wherein network application element is further configured to:

launch a computer connect component on a new computing device; and establish a second connection between the new computing device and the networking device using the one or more new network configuration settings stored in the configuration settings file, wherein the second connection is created without requiring any configuration settings associated with the second connection to be provided by the user.

34. The apparatus of claim 27, wherein the network application element is further configured to:

determine whether the networking device has made an operative connection to a wide area network, wherein packets of data can be exchanged between the networking device and the wide area network.

35. The apparatus of claim 27, wherein the network application element is further configured to:
- determine whether a wireless adapter of the first computing device is disabled; and
- automatically enable the wireless adapter if the wireless adapter is disabled.

36. The apparatus of claim 27, wherein the network application element is further configured to:
- launch an administrative component having a plurality of interactive display screens to be displayed on a user interface of the first computing device, wherein the plurality of interactive display screens includes one or more connect computer display screens providing instructions to guide the user to connect a new computing device to the networking device;
- detect the new computing device after a second connection has been established between the new computing device and the networking device;
- send a new name for the new computing device to the networking device; and
- store the new name in the first computing device.

37. The apparatus of claim 36, wherein the network application element is further configured to install the administrative component in the first computing device by a process selected from a group of processes, the group consisting of copying from the memory element and downloading from a web server.

38. The apparatus of claim 36, wherein the plurality of interactive display screens includes one or more connect other devices display screens providing instructions to guide the user to connect another wireless device to the networking device, and
- wherein one of the one or more connect other devices display screens provides one or more of the new configuration settings to be used to connect the other wireless device to the networking device.

39. The apparatus of claim 27, wherein network application element is further configured to:
- detect whether the first computing device includes an enabled wired connection to a second networking device;
- determine whether a network address of the networking device is the same as a network address of the second networking device; and
- change the network address of the networking device if the network addresses of the networking device and the second networking device are the same.

40. One or more tangible media that includes code for execution that, when executed by one or more processors, is operable to perform operations comprising:
- discovering, by a first computing device, a networking device with a network identifier, the networking device being within a wireless connectivity range from the first computing device;
- determining whether the networking device is unconfigured based on the network identifier;
- generating new network configuration settings if the networking device is unconfigured, wherein the new network configuration settings include a new network identifier for the networking device;
- sending the new network configuration settings from the first computing device to the networking device to configure the networking device for wireless connectivity, wherein the new network configuration settings are to be stored in a memory element of the networking device;
- configuring the first computing device with one or more of the new network configuration settings to initiate a wireless connection to the networking device, wherein the wireless connection is created without requiring any configuration settings associated with the wireless connection to be provided by a user; and
- storing one or more of the new network configuration settings in a configuration settings file of a transportable computer readable medium, wherein the computer readable medium is a read-writable medium, wherein the configuration settings file includes one or more elements indicating a state of the transportable computer readable medium, wherein a first state indicates the networking device is unconfigured and a second state indicates the networking device is configured.

41. The one or more tangible media of claim 40, wherein the configuring the first computing device further includes creating a wireless profile for the first computing device, wherein the wireless profile includes one or more of the new configuration settings.

42. The one or more tangible media of claim 40, wherein the new network configuration settings include a new network password.

43. The one or more tangible media of claim 40, wherein the network identifier has a predetermined format.

44. The one or more tangible media of claim 43, wherein the predetermined format of the network identifier includes at least a portion of a predefined character string assigned to the networking device.

45. The one or more tangible media of claim 40, wherein the unconfigured networking device is enabled with wireless security encryption protocols.

46. The one or more tangible media of claim 40, wherein the code for execution, when executed by the one or more processors, is operable to perform further operations comprising:
- launching a connect computer component from the transportable computer readable medium on a new computing device; and
- establishing a second connection between the new computing device and the networking device using the one or more new network configuration settings stored on the transportable computer readable medium, wherein the second connection is created without requiring any configuration settings associated with the second connection to be provided by the user.

47. The one or more tangible media of claim 40, wherein the code for execution, when executed by the one or more processors, is operable to perform further operations comprising:
- determining whether the networking device has made an operative connection to a wide area network, wherein packets of data can be exchanged between the networking device and the wide area network.

48. The one or more tangible media of claim 40, wherein the configuring the first computing device further includes:
- determining whether a wireless adapter of the first computing device is disabled; and
- automatically enabling the wireless adapter if the wireless adapter is disabled.

* * * * *